US012594566B2

(12) United States Patent
Maier

(10) Patent No.: US 12,594,566 B2
(45) Date of Patent: Apr. 7, 2026

(54) SPRAY GUN, IN PARTICULAR A PRESSURIZED AIR ATOMIZATION PAINT SPRAY GUN, IN PARTICULAR A HAND-HELD PRESSURIZED AIR ATOMIZATION PAINT SPRAY GUN

(71) Applicant: SATA GmbH & Co. KG, Kornwestheim (DE)

(72) Inventor: Norbert Maier, Allmersbach (DE)

(73) Assignee: SATA GmbH & Co. KG, Kornwestheim (DE)

( * ) Notice: Subject to any disclaimer, the term of this patent is extended or adjusted under 35 U.S.C. 154(b) by 804 days.

(21) Appl. No.: 17/908,945

(22) PCT Filed: Feb. 18, 2021

(86) PCT No.: PCT/EP2021/054059
§ 371 (c)(1),
(2) Date: Sep. 2, 2022

(87) PCT Pub. No.: WO2021/175611
PCT Pub. Date: Sep. 10, 2021

(65) Prior Publication Data

US 2023/0087047 A1 Mar. 23, 2023

(30) Foreign Application Priority Data

Mar. 6, 2020 (DE) .................... 10 2020 106 172.2

(51) Int. Cl.
*B05B 12/00* (2018.01)
*B05B 1/30* (2006.01)

(52) U.S. Cl.
CPC ............ *B05B 12/002* (2013.01); *B05B 1/306* (2013.01)

(58) Field of Classification Search
CPC ..... B05B 7/066; B05B 7/1272; B05B 7/0815; B05B 7/1245; B05B 12/002; B05B 1/306
See application file for complete search history.

(56) References Cited

U.S. PATENT DOCUMENTS 40,433 A 10/1863 Sees
327,260 A 9/1885 Hart
(Continued)

FOREIGN PATENT DOCUMENTS

AT 153883 6/1997
AT 163577 3/1998
(Continued)

OTHER PUBLICATIONS

Response to Office Action dated Mar. 9, 2020 for U.S. Appl. No. 14/815,210.
(Continued)

*Primary Examiner* — Jason J Boeckmann
(74) *Attorney, Agent, or Firm* — Fleit Intellectual Property Law; Paul D. Bianco; Stephen Bongini

(57) ABSTRACT

A spray gun has at least one air valve that can be actuated by at least one trigger, having at least one valve inlet region and at least one valve outlet region. The spray gun has at least one material valve designed in such a way that it can be pneumatically actuated by air from the at least one valve outlet region. With this design, the force to be exerted to actuate the actuation element by the user of the spray gun is significantly lower than in prior spray guns, which allows for effortless operation.

20 Claims, 4 Drawing Sheets

(56) References Cited

U.S. PATENT DOCUMENTS

| | | | |
|---|---|---|---|
| 459,432 | A | 9/1891 | Anderson |
| 459,433 | A | 9/1891 | Avery |
| 548,816 | A | 10/1895 | Paul |
| 552,213 | A | 12/1895 | Troy |
| 552,715 | A | 1/1896 | Lugrin |
| 563,505 | A | 7/1896 | McCornack |
| 574,880 | A | 1/1897 | Collison |
| 581,107 | A | 4/1897 | Emery |
| 644,803 | A | 3/1900 | Justi |
| 672,012 | A | 4/1901 | Ruper |
| 1,610,190 | A | 12/1926 | Anderson |
| 1,662,496 | A | 3/1928 | Forsgard |
| 1,703,383 | A | 2/1929 | Birkenmaier |
| 1,703,384 | A | 2/1929 | Birkenmaier |
| 1,711,221 | A | 4/1929 | Blakeslee |
| 1,751,787 | A | 3/1930 | Binks |
| 1,889,201 | A | 11/1932 | Holveck |
| 1,958,730 | A | 5/1934 | Tracy |
| 2,004,303 | A | 6/1935 | Wahlin |
| 2,008,381 | A | 7/1935 | Beeg |
| D99,473 | S | 4/1936 | Bramsen |
| 2,049,700 | A | 8/1936 | Gustafsson |
| 2,051,210 | A | 8/1936 | Gustafsson |
| 2,070,696 | A | 2/1937 | Tracy |
| 2,116,036 | A | 5/1938 | Money |
| 2,125,445 | A | 8/1938 | Holveck |
| 2,198,441 | A | 4/1940 | Mollart |
| 2,204,599 | A | 6/1940 | Jenkins |
| 2,269,057 | A | 1/1942 | Jenkins |
| D133,223 | S | 7/1942 | Tammen |
| 2,356,865 | A | 8/1944 | Mason |
| 2,416,856 | A | 3/1947 | Thomsen |
| 2,416,923 | A | 3/1947 | Jenkins |
| 2,470,718 | A | 5/1949 | Peeps |
| 2,533,953 | A | 12/1950 | Peeps |
| 2,557,593 | A | 6/1951 | Bjorkman |
| 2,557,606 | A | 6/1951 | Liedberg |
| 2,559,091 | A | 7/1951 | Reasenberg |
| 2,578,402 | A | 12/1951 | Dalrymple |
| 2,609,961 | A | 9/1952 | Sapien |
| 2,612,899 | A | 10/1952 | Webb |
| 2,626,188 | A | 1/1953 | Dalrymple |
| 2,646,314 | A | 7/1953 | Peeps |
| 2,721,004 | A | 10/1955 | Schultz |
| 2,743,963 | A | 5/1956 | Peeps |
| 2,844,267 | A | 7/1958 | Petriccione |
| 2,886,252 | A | 5/1959 | Ehrensperger |
| 3,090,530 | A | 5/1963 | Peeps |
| D196,477 | S | 10/1963 | Kelly |
| 3,159,472 | A | 12/1964 | Revell |
| D200,594 | S | 3/1965 | Sass |
| 3,240,398 | A | 3/1966 | Dalton, Jr. |
| D204,306 | S | 4/1966 | Hamm |
| D205,760 | S | 9/1966 | Hocutt et al. |
| 3,327,949 | A | 6/1967 | Eull |
| D208,903 | S | 10/1967 | Zadron et al. |
| 3,344,992 | A | 10/1967 | Norris |
| D209,792 | S | 1/1968 | Clark |
| 3,381,845 | A | 5/1968 | MacDonald |
| 3,417,650 | A | 12/1968 | Varrin |
| 3,420,106 | A | 1/1969 | Keller et al. |
| 3,435,683 | A | 4/1969 | Keller et al. |
| 3,463,363 | A | 8/1969 | Zelna |
| 3,482,781 | A | 12/1969 | Sharpe |
| D217,828 | S | 6/1970 | Felske |
| 3,524,589 | A | 8/1970 | Pelton, Jr. |
| 3,527,372 | A | 9/1970 | Manning |
| 3,583,632 | A | 6/1971 | Schaffer |
| 3,622,078 | A | 11/1971 | Gronert |
| 3,645,562 | A | 2/1972 | Fandetti et al. |
| 3,656,493 | A | 4/1972 | Black et al. |
| 3,714,967 | A | 2/1973 | Zupan et al. |
| 3,746,253 | A | 7/1973 | Walberg |
| 3,747,850 | A | 7/1973 | Hastings et al. |
| 3,771,539 | A | 11/1973 | De Santis |
| 3,840,143 | A | 10/1974 | Davis et al. |
| 3,848,807 | A | 11/1974 | Partida |
| 3,857,511 | A | 12/1974 | Govindan |
| 3,870,223 | A | 3/1975 | Wyant |
| 3,873,023 | A | 3/1975 | Moss et al. |
| 3,938,739 | A | 2/1976 | Bertilsson et al. |
| 4,000,915 | A | 1/1977 | Strom |
| D245,048 | S | 7/1977 | Pool |
| 4,105,164 | A | 8/1978 | Lau |
| D252,097 | S | 6/1979 | Probst et al. |
| 4,160,525 | A | 7/1979 | Wagner |
| 4,162,042 | A | 7/1979 | Mommsen |
| 4,171,091 | A | 10/1979 | van Hardeveld et al. |
| 4,210,263 | A | 7/1980 | Bos |
| 4,273,293 | A | 6/1981 | Hastings |
| 4,278,276 | A | 7/1981 | Ekman |
| 4,411,387 | A | 10/1983 | Stern et al. |
| 4,478,370 | A | 10/1984 | Hastings |
| D276,472 | S | 11/1984 | Harrison |
| D278,543 | S | 4/1985 | Gintz |
| 4,545,536 | A | 10/1985 | Avidon |
| 4,562,965 | A | 1/1986 | Ihmels et al. |
| 4,572,437 | A | 2/1986 | Huber et al. |
| 4,580,035 | A | 4/1986 | Luscher |
| 4,585,168 | A | 4/1986 | Even et al. |
| 4,614,300 | A | 9/1986 | Falcoff |
| 4,643,330 | A | 2/1987 | Kennedy |
| 4,653,661 | A | 3/1987 | Buchner et al. |
| 4,667,878 | A | 5/1987 | Behr |
| 4,713,257 | A | 12/1987 | Luttermoeller |
| D293,850 | S | 1/1988 | Ogden et al. |
| 4,730,753 | A | 3/1988 | Grime |
| 4,767,057 | A | 8/1988 | Degli |
| D298,372 | S | 11/1988 | Taylor, Jr. |
| 4,784,184 | A | 11/1988 | Gates |
| 4,806,736 | A | 2/1989 | Schirico |
| 4,826,539 | A | 5/1989 | Harpold |
| 4,832,232 | A | 5/1989 | Broccoli |
| 4,844,347 | A | 7/1989 | Konhäuser |
| 4,854,504 | A | 8/1989 | Hedger, Jr. et al. |
| 4,863,781 | A | 9/1989 | Kronzer |
| 4,877,144 | A | 10/1989 | Thanisch |
| D305,057 | S | 12/1989 | Morgan |
| 4,887,747 | A | 12/1989 | Ostrowsky et al. |
| 4,901,761 | A | 2/1990 | Taylor |
| 4,906,151 | A | 3/1990 | Kubis |
| 4,917,300 | A | 4/1990 | Gloviak et al. |
| 4,946,075 | A | 8/1990 | Lundback |
| 4,964,361 | A | 10/1990 | Aebersold |
| 4,967,600 | A | 11/1990 | Keller |
| 4,969,603 | A | 11/1990 | Norman |
| 4,973,184 | A | 11/1990 | La Salle |
| D313,064 | S | 12/1990 | Lind |
| D314,421 | S | 2/1991 | Tajima et al. |
| D314,588 | S | 2/1991 | Denham |
| 4,989,787 | A | 2/1991 | Nikkel et al. |
| 5,020,700 | A | 6/1991 | Krzywdziak et al. |
| D318,877 | S | 8/1991 | Miranda et al. |
| 5,042,840 | A | 8/1991 | Rieple et al. |
| D321,597 | S | 11/1991 | Cerny |
| 5,064,119 | A | 11/1991 | Mellette |
| 5,071,074 | A | 12/1991 | Lind |
| 5,074,334 | A | 12/1991 | Onodera |
| 5,078,323 | A | 1/1992 | Frank |
| 5,078,325 | A | 1/1992 | Waryu |
| 5,080,285 | A | 1/1992 | Toth |
| 5,088,648 | A | 2/1992 | Schmon |
| 5,090,623 | A | 2/1992 | Burns et al. |
| 5,102,045 | A | 4/1992 | Diana |
| 5,119,992 | A | 6/1992 | Grime |
| 5,125,391 | A | 6/1992 | Srivastava et al. |
| 5,135,124 | A | 8/1992 | Wobser |
| 5,143,102 | A | 9/1992 | Blaul |
| 5,165,605 | A | 11/1992 | Morita et al. |
| 5,170,941 | A | 12/1992 | Morita et al. |
| 5,190,219 | A | 3/1993 | Copp, Jr. |
| 5,191,797 | A | 3/1993 | Smith |
| 5,209,405 | A | 5/1993 | Robinson et al. |
| 5,228,488 | A | 7/1993 | Fletcher |

(56) References Cited

U.S. PATENT DOCUMENTS

| | | | |
|---|---|---|---|
| 5,232,299 | A | 8/1993 | Hiss |
| 5,236,128 | A | 8/1993 | Morita et al. |
| 5,249,746 | A | 10/1993 | Kaneko et al. |
| D341,186 | S | 11/1993 | Albers |
| 5,289,974 | A | 3/1994 | Grime et al. |
| 5,322,221 | A | 6/1994 | Anderson |
| 5,325,473 | A | 6/1994 | Monroe et al. |
| 5,332,156 | A | 7/1994 | Wheeler |
| 5,333,506 | A | 8/1994 | Smith et al. |
| 5,333,908 | A | 8/1994 | Dorney et al. |
| 5,344,078 | A | 9/1994 | Fritz et al. |
| 5,367,148 | A | 11/1994 | Storch et al. |
| D353,836 | S | 12/1994 | Carvelli et al. |
| 5,381,962 | A | 1/1995 | Teague |
| 5,435,491 | A | 7/1995 | Sakuma |
| 5,443,642 | A | 8/1995 | Bienduga |
| 5,456,414 | A | 10/1995 | Burns et al. |
| D365,852 | S | 1/1996 | Gagnon et al. |
| 5,503,439 | A | 4/1996 | LaJeunesse et al. |
| 5,529,245 | A | 6/1996 | Brown |
| 5,533,674 | A | 7/1996 | Feyrer et al. |
| 5,540,385 | A | 7/1996 | Garlick |
| 5,540,386 | A | 7/1996 | Roman |
| D376,637 | S | 12/1996 | Kieffer |
| 5,582,350 | A | 12/1996 | Kosmyna et al. |
| 5,584,899 | A | 12/1996 | Shorts |
| 5,588,562 | A | 12/1996 | Sander et al. |
| 5,592,597 | A | 1/1997 | Kiss |
| 5,609,302 | A | 3/1997 | Smith |
| 5,613,637 | A | 3/1997 | Schmon |
| D380,301 | S | 7/1997 | Kogutt |
| 5,655,714 | A | 8/1997 | Kieffer et al. |
| 5,662,444 | A | 9/1997 | Schmidt, Jr. |
| 5,667,143 | A | 9/1997 | Sebion et al. |
| 5,695,125 | A | 12/1997 | Kumar |
| 5,704,381 | A | 1/1998 | Millan et al. |
| 5,718,767 | A | 2/1998 | Crum et al. |
| D391,403 | S | 3/1998 | Josephs |
| 5,725,161 | A | 3/1998 | Hartle |
| RE35,769 | E | 4/1998 | Grime et al. |
| 5,755,363 | A | 5/1998 | Gantner et al. |
| 5,762,228 | A | 6/1998 | Morgan et al. |
| 5,803,360 | A | 9/1998 | Spitznagel |
| 5,816,501 | A | 10/1998 | LoPresti et al. |
| 5,829,682 | A | 11/1998 | Haruch |
| 5,836,517 | A | 11/1998 | Burns et al. |
| D402,820 | S | 12/1998 | Morison et al. |
| 5,843,515 | A | 12/1998 | Crum et al. |
| 5,853,014 | A | 12/1998 | Rosenauer |
| D405,503 | S | 2/1999 | Edo |
| 5,874,680 | A | 2/1999 | Moore |
| 5,884,006 | A | 3/1999 | Frohlich et al. |
| D409,719 | S | 5/1999 | Kaneko |
| D412,965 | S | 8/1999 | Kieffer |
| 5,941,461 | A | 8/1999 | Akin et al. |
| 5,951,190 | A | 9/1999 | Wilson |
| 5,951,296 | A | 9/1999 | Klein |
| 5,954,268 | A | 9/1999 | Joshi et al. |
| D414,636 | S | 10/1999 | Wiese |
| 5,979,797 | A | 11/1999 | Castellano |
| 5,992,763 | A | 11/1999 | Smith et al. |
| 6,006,930 | A | 12/1999 | Dreyer et al. |
| 6,010,082 | A | 1/2000 | Peterson |
| 6,017,394 | A | 1/2000 | Crum et al. |
| 6,019,294 | A | 2/2000 | Anderson |
| 6,036,109 | A | 3/2000 | DeYoung |
| 6,039,218 | A | 3/2000 | Beck |
| 6,050,499 | A | 4/2000 | Takayama |
| 6,053,429 | A | 4/2000 | Chang |
| 6,056,213 | A | 5/2000 | Ruta et al. |
| 6,056,215 | A | 5/2000 | Hansinger |
| 6,089,471 | A | 7/2000 | Scholl |
| 6,089,607 | A | 7/2000 | Keeney et al. |
| 6,091,053 | A | 7/2000 | Aonuma |
| 6,092,740 | A | 7/2000 | Liu |
| 6,105,881 | A | 8/2000 | Kitajima |
| 6,132,511 | A | 10/2000 | Crum et al. |
| D435,379 | S | 12/2000 | Nguyen |
| 6,230,986 | B1 | 5/2001 | Vacher et al. |
| 6,250,567 | B1 | 6/2001 | Lewis et al. |
| 6,267,301 | B1 | 7/2001 | Haruch |
| 6,276,616 | B1 | 8/2001 | Jenkins |
| D448,451 | S | 9/2001 | Turnbull et al. |
| 6,308,991 | B1 | 10/2001 | Royer |
| D457,599 | S | 5/2002 | Karwoski et al. |
| D459,432 | S | 6/2002 | Schmon |
| D459,433 | S | 6/2002 | Schmon |
| 6,402,058 | B2 | 6/2002 | Kaneko et al. |
| 6,402,062 | B1 | 6/2002 | Bending et al. |
| 6,431,466 | B1 | 8/2002 | Kitajima |
| 6,435,426 | B1 | 8/2002 | Copp, Jr. |
| 6,442,276 | B1 | 8/2002 | Doljack |
| 6,450,422 | B1 | 9/2002 | Maggio |
| 6,494,387 | B1 | 12/2002 | Kaneko |
| 6,536,684 | B1 | 3/2003 | Wei |
| 6,536,687 | B1 | 3/2003 | Navis et al. |
| D472,730 | S | 4/2003 | Sparkowski |
| 6,540,114 | B1 | 4/2003 | Popovich et al. |
| 6,543,632 | B1 | 4/2003 | McIntyre et al. |
| 6,547,160 | B1 | 4/2003 | Huang |
| 6,547,884 | B1 | 4/2003 | Crum et al. |
| 6,553,712 | B1 | 4/2003 | Majerowski et al. |
| 6,554,009 | B1 | 4/2003 | Beijbom et al. |
| D474,528 | S | 5/2003 | Huang |
| 6,585,173 | B2 | 7/2003 | Schmon et al. |
| 6,595,441 | B2 | 7/2003 | Petrie et al. |
| 6,612,506 | B1 | 9/2003 | Huang |
| 6,626,382 | B1 | 9/2003 | Liu |
| 6,626,383 | B1 | 9/2003 | Campbell |
| 6,647,997 | B2 | 11/2003 | Mohn |
| 6,661,438 | B1 | 12/2003 | Shiraishi et al. |
| D485,685 | S | 1/2004 | Zupkofska et al. |
| 6,675,845 | B2 | 1/2004 | Volpenheim et al. |
| 6,692,118 | B2 | 2/2004 | Michele et al. |
| 6,712,292 | B1 | 3/2004 | Gosis et al. |
| 6,717,584 | B2 | 4/2004 | Kulczycka |
| 6,732,751 | B2 | 5/2004 | Chiang |
| 6,763,964 | B1 | 7/2004 | Hurlbut et al. |
| 6,766,763 | B2 | 7/2004 | Crum et al. |
| 6,786,345 | B2 | 9/2004 | Richards |
| 6,796,514 | B1 | 9/2004 | Schwartz |
| 6,801,211 | B2 | 10/2004 | Forsline et al. |
| 6,820,824 | B1 | 11/2004 | Joseph et al. |
| 6,843,390 | B1 | 1/2005 | Bristor |
| 6,845,924 | B2 | 1/2005 | Schmon |
| 6,855,173 | B2 | 2/2005 | Ehrnsperger et al. |
| 6,863,310 | B1 | 3/2005 | Petkovsek |
| 6,863,920 | B2 | 3/2005 | Crum et al. |
| 6,874,656 | B2 | 4/2005 | Rohr et al. |
| 6,874,664 | B1 | 4/2005 | Montgomery |
| 6,874,708 | B2 | 4/2005 | Reetz, III |
| 6,877,677 | B2 | 4/2005 | Schmon et al. |
| 6,929,019 | B2 | 8/2005 | Weinmann et al. |
| 6,945,429 | B2 | 9/2005 | Gosis et al. |
| 6,955,180 | B2 | 10/2005 | Kocherlakota et al. |
| 6,962,432 | B2 | 11/2005 | Hofeldt |
| 6,963,331 | B1 | 11/2005 | Kobayashi et al. |
| 7,017,838 | B2 | 3/2006 | Schmon |
| 7,018,154 | B2 | 3/2006 | Schmon |
| D519,687 | S | 4/2006 | Zahav |
| 7,032,839 | B2 | 4/2006 | Blette et al. |
| 7,036,752 | B1 | 5/2006 | Hsiang |
| 7,083,119 | B2 | 8/2006 | Bouic et al. |
| 7,090,148 | B2 | 8/2006 | Petrie et al. |
| 7,097,118 | B1 | 8/2006 | Huang |
| D528,192 | S | 9/2006 | Nicholson |
| 7,106,343 | B1 | 9/2006 | Hickman |
| 7,165,732 | B2 | 1/2007 | Kosmyna et al. |
| 7,172,139 | B2 | 2/2007 | Bouic et al. |
| 7,175,110 | B2 | 2/2007 | Vicentini |
| 7,182,213 | B2 | 2/2007 | King |
| D538,050 | S | 3/2007 | Tardif |
| D538,493 | S | 3/2007 | Zimmerle et al. |
| D538,886 | S | 3/2007 | Huang |

(56) References Cited

U.S. PATENT DOCUMENTS

| | | | |
|---|---|---|---|
| 7,194,829 | B2 | 3/2007 | Boire et al. |
| D541,053 | S | 4/2007 | Sanders |
| D541,088 | S | 4/2007 | Nesci |
| 7,201,336 | B2 | 4/2007 | Blette et al. |
| 7,216,813 | B2 | 5/2007 | Rogers |
| D545,943 | S | 7/2007 | Rodgers et al. |
| 7,246,713 | B2 | 7/2007 | King |
| 7,249,519 | B2 | 7/2007 | Rogers |
| D548,816 | S | 8/2007 | Schmon |
| 7,255,293 | B2 | 8/2007 | Dodd |
| 7,264,131 | B2 | 9/2007 | Tsutsumi et al. |
| D552,213 | S | 10/2007 | Schmon |
| D552,715 | S | 10/2007 | Schmon |
| D554,703 | S | 11/2007 | Josephson |
| 7,328,855 | B2 | 2/2008 | Chatron et al. |
| D563,505 | S | 3/2008 | Schmon |
| 7,374,111 | B2 | 5/2008 | Joseph et al. |
| D570,448 | S | 6/2008 | Wang |
| D571,463 | S | 6/2008 | Chesnin |
| 7,384,004 | B2 | 6/2008 | Rogers |
| 7,389,945 | B2 | 6/2008 | Huang |
| RE40,433 | E | 7/2008 | Schmon |
| D573,227 | S | 7/2008 | Mirazita et al. |
| D574,926 | S | 8/2008 | Huang |
| D574,927 | S | 8/2008 | Larsen |
| D575,374 | S | 8/2008 | Huang |
| 7,410,106 | B2 | 8/2008 | Escoto, Jr. et al. |
| 7,416,140 | B2 | 8/2008 | Camilleri et al. |
| 7,422,164 | B2 | 9/2008 | Matsumoto |
| D579,213 | S | 10/2008 | Aipa |
| D581,107 | S | 11/2008 | Schmon |
| D581,483 | S | 11/2008 | Bass et al. |
| D583,013 | S | 12/2008 | Wang |
| 7,458,612 | B1 | 12/2008 | Bennett |
| 7,472,840 | B2 | 1/2009 | Gregory |
| D588,231 | S | 3/2009 | Pellin |
| 7,533,678 | B2 | 5/2009 | Rosa |
| 7,540,434 | B2 | 6/2009 | Gohring et al. |
| 7,542,032 | B2 | 6/2009 | Kruse |
| 7,568,638 | B2 | 8/2009 | Gehrung |
| D604,394 | S | 11/2009 | Wang |
| 7,614,571 | B2 | 11/2009 | Camilleri et al. |
| D607,086 | S | 12/2009 | Kosaka |
| 7,624,869 | B2 | 12/2009 | Primer |
| D607,972 | S | 1/2010 | Wang |
| D608,858 | S | 1/2010 | Baltz et al. |
| D613,820 | S | 4/2010 | Chou |
| D614,731 | S | 4/2010 | Wang |
| 7,694,893 | B2 | 4/2010 | Zittel et al. |
| 7,694,896 | B2 | 4/2010 | Turnbull et al. |
| D615,586 | S | 5/2010 | Kudimi |
| D616,022 | S | 5/2010 | Kudimi |
| D616,527 | S | 5/2010 | Anderson et al. |
| 7,765,876 | B1 | 8/2010 | Chen |
| D624,668 | S | 9/2010 | Noppe |
| 7,810,744 | B2 | 10/2010 | Schmon et al. |
| 7,819,341 | B2 | 10/2010 | Schmon et al. |
| D627,039 | S | 11/2010 | Yu |
| D627,432 | S | 11/2010 | Escoto et al. |
| 7,823,806 | B2 | 11/2010 | Schmon |
| D629,623 | S | 12/2010 | Lampe |
| 7,856,940 | B2 | 12/2010 | Wendler |
| 7,913,938 | B2 | 3/2011 | Cooper |
| 7,922,107 | B2 | 4/2011 | Fox |
| D637,269 | S | 5/2011 | Wang |
| D638,121 | S | 5/2011 | Villasana |
| D639,863 | S | 6/2011 | Langan |
| D641,067 | S | 7/2011 | Wang |
| D644,716 | S | 9/2011 | Gehrung |
| D644,803 | S | 9/2011 | Schmon |
| D645,094 | S | 9/2011 | Langan |
| 8,042,402 | B2 | 10/2011 | Brown et al. |
| D649,196 | S | 11/2011 | Langan |
| 8,052,071 | B2 | 11/2011 | Kruse |
| D655,347 | S | 3/2012 | Gehrung |
| 8,127,963 | B2 | 3/2012 | Gerson et al. |
| D657,276 | S | 4/2012 | Brose |
| D661,492 | S | 6/2012 | Ranschau |
| D661,742 | S | 6/2012 | Clark |
| D663,960 | S | 7/2012 | Jeronimo |
| 8,225,892 | B2 | 7/2012 | Ben-Tzvi |
| D664,773 | S | 8/2012 | Papin |
| 8,240,579 | B1 | 8/2012 | Bennett |
| 8,297,536 | B2 | 10/2012 | Ruda |
| D670,085 | S | 11/2012 | Brookman et al. |
| 8,308,086 | B2 | 11/2012 | Micheli |
| D671,988 | S | 12/2012 | Leipold |
| D672,012 | S | 12/2012 | Brose |
| D674,880 | S | 1/2013 | Schmon |
| 8,352,744 | B2 | 1/2013 | Kruse |
| 8,360,345 | B2 | 1/2013 | Micheli |
| D681,162 | S | 4/2013 | Kruse |
| 8,444,067 | B2 | 5/2013 | Schmon et al. |
| 8,454,759 | B2 | 6/2013 | Selsvik |
| 8,481,124 | B2 | 7/2013 | Nolte et al. |
| D689,590 | S | 9/2013 | Brose |
| D689,593 | S | 9/2013 | Schmon |
| D690,799 | S | 10/2013 | Maier |
| D692,530 | S | 10/2013 | Gehrung |
| D692,532 | S | 10/2013 | Li et al. |
| 8,616,434 | B2 | 12/2013 | Wilen |
| D697,584 | S | 1/2014 | Schmon |
| D698,008 | S | 1/2014 | Schmon et al. |
| 8,626,674 | B2 | 1/2014 | Whitehouse |
| 8,642,131 | B2 | 2/2014 | Nolte et al. |
| D703,293 | S | 4/2014 | Price |
| 8,690,083 | B2 | 4/2014 | Drozd |
| D704,300 | S | 5/2014 | Li et al. |
| 8,757,182 | B2 | 6/2014 | Schmon |
| 8,807,460 | B2 | 8/2014 | Charpie et al. |
| 8,857,732 | B2 | 10/2014 | Brose |
| 8,870,097 | B2 | 10/2014 | Micheli |
| D720,015 | S | 12/2014 | Kruse |
| D720,041 | S | 12/2014 | Robinson |
| 8,899,501 | B2 | 12/2014 | Fox et al. |
| D721,785 | S | 1/2015 | Gehrung |
| 8,925,836 | B2 | 1/2015 | Dettlaff |
| D726,982 | S | 4/2015 | Campelli |
| D733,369 | S | 6/2015 | Tschan |
| D733,453 | S | 7/2015 | Tschan |
| D734,428 | S | 7/2015 | Wang |
| D734,429 | S | 7/2015 | Wang |
| D734,571 | S | 7/2015 | Tschan |
| 9,073,068 | B2 | 7/2015 | Krayer et al. |
| D737,126 | S | 8/2015 | Tschan |
| D740,393 | S | 10/2015 | Gehrung |
| D745,636 | S | 12/2015 | Lin |
| 9,220,853 | B2 | 12/2015 | Vogt |
| D757,216 | S | 5/2016 | Gherung |
| 9,333,519 | B2 | 5/2016 | Brose |
| D758,533 | S | 6/2016 | Dettlaff |
| D758,537 | S | 6/2016 | Gehrung |
| 9,433,953 | B2 | 9/2016 | Ghesla |
| D768,820 | S | 10/2016 | Binz |
| D770,593 | S | 11/2016 | Gehrung |
| 9,498,788 | B2 | 11/2016 | Kosaka |
| 9,533,317 | B2 | 1/2017 | Gehrung et al. |
| D792,557 | S | 7/2017 | Wang |
| D794,756 | S | 8/2017 | Wang |
| 9,782,784 | B2 | 10/2017 | Schmon et al. |
| D803,354 | S | 11/2017 | Negri |
| 9,878,336 | B2 | 1/2018 | Gehrung |
| 9,878,340 | B2 | 1/2018 | Schmon et al. |
| D812,719 | S | 3/2018 | Kosaka |
| D820,389 | S | 6/2018 | Gehrung |
| D830,506 | S | 10/2018 | Gehrung |
| D831,792 | S | 10/2018 | Gehrung |
| D835,235 | S | 12/2018 | Gehrung et al. |
| 10,189,037 | B2 | 1/2019 | Schmon et al. |
| 10,247,313 | B2 | 4/2019 | Chien |
| 10,464,076 | B2 | 11/2019 | Kruse |
| 10,471,449 | B2 | 11/2019 | Gehrung |
| D877,294 | S | 3/2020 | Johnston |
| 10,702,879 | B2 | 7/2020 | Gehrung |

(56) References Cited

U.S. PATENT DOCUMENTS

| | | | |
|---|---|---|---|
| 10,940,498 | B2 | 3/2021 | Fideler |
| D927,645 | S | 8/2021 | Davies |
| D929,838 | S | 9/2021 | Tschan |
| D934,383 | S | 10/2021 | Stech |
| 11,141,747 | B2 | 10/2021 | Schmon |
| D968,568 | S | 11/2022 | Shih |
| 11,865,558 | B2 | 1/2024 | Volk |
| 2001/0004996 | A1 | 6/2001 | Schmon |
| 2001/0040192 | A1 | 11/2001 | Kaneko et al. |
| 2002/0092928 | A1 | 7/2002 | Conroy |
| 2002/0134861 | A1 | 9/2002 | Petrie et al. |
| 2002/0148501 | A1 | 10/2002 | Shieh |
| 2002/0170978 | A1 | 11/2002 | Mohn |
| 2003/0006322 | A1 | 1/2003 | Hartle et al. |
| 2003/0025000 | A1 | 2/2003 | Schmon et al. |
| 2003/0066218 | A1 | 4/2003 | Schweikert |
| 2003/0121476 | A1 | 7/2003 | McIntyre et al. |
| 2003/0127046 | A1 | 7/2003 | Zehner et al. |
| 2003/0164408 | A1 | 9/2003 | Schmon |
| 2003/0173419 | A1 | 9/2003 | Huang |
| 2003/0177979 | A1 | 9/2003 | Crum et al. |
| 2003/0189105 | A1 | 10/2003 | Schmon |
| 2003/0209568 | A1 | 11/2003 | Douglas et al. |
| 2003/0213857 | A1 | 11/2003 | Schmon et al. |
| 2003/0218596 | A1 | 11/2003 | Eschler |
| 2003/0230636 | A1 | 12/2003 | Rogers |
| 2004/0046051 | A1 | 3/2004 | Santa Cruz et al. |
| 2004/0050432 | A1 | 3/2004 | Breda |
| 2004/0104194 | A1 | 6/2004 | Dennison |
| 2004/0129738 | A1 | 7/2004 | Stukas |
| 2004/0140373 | A1 | 7/2004 | Joseph et al. |
| 2004/0155063 | A1 | 8/2004 | Hofeldt |
| 2004/0159720 | A1 | 8/2004 | Komornicki |
| 2004/0177890 | A1 | 9/2004 | Weinmann |
| 2004/0191406 | A1 | 9/2004 | Crum et al. |
| 2004/0195382 | A1 | 10/2004 | Anderson |
| 2004/0217201 | A1 | 11/2004 | Ruda |
| 2004/0233223 | A1 | 11/2004 | Schkolne et al. |
| 2004/0245208 | A1 | 12/2004 | Dennison |
| 2005/0001060 | A1 | 1/2005 | Robinson |
| 2005/0056613 | A1 | 3/2005 | King |
| 2005/0082249 | A1 | 4/2005 | King |
| 2005/0127201 | A1 | 6/2005 | Matsumoto |
| 2005/0145723 | A1 | 7/2005 | Blette et al. |
| 2005/0145724 | A1 | 7/2005 | Blette et al. |
| 2005/0161525 | A1 | 7/2005 | Johansson |
| 2005/0178854 | A1 | 8/2005 | Dodd |
| 2005/0189445 | A1 | 9/2005 | Hartle et al. |
| 2005/0215284 | A1 | 9/2005 | Su |
| 2005/0218246 | A1 | 10/2005 | Chatron et al. |
| 2005/0220943 | A1 | 10/2005 | Abrams et al. |
| 2005/0242207 | A1 | 11/2005 | Tejeda |
| 2005/0248148 | A1 | 11/2005 | Schenck et al. |
| 2005/0252993 | A1 | 11/2005 | Rogers |
| 2005/0252994 | A1 | 11/2005 | Rogers |
| 2005/0268949 | A1 | 12/2005 | Rosa |
| 2005/0284963 | A1 | 12/2005 | Reedy |
| 2006/0000927 | A1 | 1/2006 | Ruda |
| 2006/0007123 | A1 | 1/2006 | Wilson et al. |
| 2006/0048803 | A1 | 3/2006 | Jessup et al. |
| 2006/0081060 | A1 | 4/2006 | Forster |
| 2006/0108449 | A1 | 5/2006 | Sodemann |
| 2006/0113409 | A1 | 6/2006 | Camilleri et al. |
| 2006/0118661 | A1 | 6/2006 | Hartle |
| 2006/0131151 | A1 | 6/2006 | Marchand |
| 2006/0171771 | A1 | 8/2006 | Kruse |
| 2006/0192377 | A1 | 8/2006 | Bauer et al. |
| 2006/0196891 | A1 | 9/2006 | Gerson et al. |
| 2007/0029788 | A1 | 2/2007 | Adler |
| 2007/0055883 | A1 | 3/2007 | Kruse |
| 2007/0131795 | A1 | 6/2007 | Abbate et al. |
| 2007/0158349 | A1 | 7/2007 | Schmon et al. |
| 2007/0205305 | A1 | 9/2007 | Vagedes |
| 2007/0221754 | A1 | 9/2007 | Gehrung |
| 2007/0228190 | A1 | 10/2007 | Tanner |
| 2007/0252378 | A1 | 11/2007 | Chambers |
| 2007/0262169 | A1 | 11/2007 | Wang |
| 2007/0262172 | A1 | 11/2007 | Huffman |
| 2008/0011879 | A1 | 1/2008 | Gerson et al. |
| 2008/0019789 | A1 | 1/2008 | Dunaway et al. |
| 2008/0029619 | A1 | 2/2008 | Gohring et al. |
| 2008/0128533 | A1 | 6/2008 | Gehrung |
| 2008/0179763 | A1 | 7/2008 | Schmon et al. |
| 2008/0251607 | A1 | 10/2008 | Krayer et al. |
| 2008/0251977 | A1 | 10/2008 | Naruse et al. |
| 2008/0264892 | A1 | 10/2008 | Nozawa |
| 2008/0272213 | A1 | 11/2008 | Ting |
| 2008/0296410 | A1 | 12/2008 | Carey et al. |
| 2009/0014557 | A1 | 1/2009 | Schmon et al. |
| 2009/0026288 | A1 | 1/2009 | Shih |
| 2009/0026290 | A1 | 1/2009 | Fox |
| 2009/0045623 | A1 | 2/2009 | Schmon |
| 2009/0072050 | A1 | 3/2009 | Ruda |
| 2009/0078789 | A1 | 3/2009 | Kruse |
| 2009/0078790 | A1 | 3/2009 | Camilleri et al. |
| 2009/0143745 | A1 | 6/2009 | Langan et al. |
| 2009/0152382 | A1 | 6/2009 | Charpie |
| 2009/0179081 | A1 | 7/2009 | Charpie |
| 2009/0183516 | A1 | 7/2009 | Appler et al. |
| 2009/0235864 | A1 | 9/2009 | Khoury et al. |
| 2009/0266915 | A1 | 10/2009 | Fedorov |
| 2009/0302133 | A1 | 12/2009 | Micheli |
| 2010/0021646 | A1 | 1/2010 | Nolte et al. |
| 2010/0059533 | A1 | 3/2010 | Unger et al. |
| 2010/0084493 | A1 | 4/2010 | Troudt |
| 2010/0108783 | A1 | 5/2010 | Joseph et al. |
| 2010/0126541 | A1 | 5/2010 | Schmon |
| 2010/0163649 | A1 | 7/2010 | Bass et al. |
| 2010/0206963 | A1 | 8/2010 | Huang |
| 2010/0270390 | A1 | 10/2010 | Reitz |
| 2010/0270400 | A1 | 10/2010 | Evar et al. |
| 2011/0024524 | A1 | 2/2011 | Fox |
| 2011/0121103 | A1 | 5/2011 | Carleton et al. |
| 2011/0125607 | A1 | 5/2011 | Wilen |
| 2011/0127767 | A1 | 6/2011 | Wicks et al. |
| 2011/0168811 | A1 | 7/2011 | Fox et al. |
| 2011/0174901 | A1 | 7/2011 | Dettlaff et al. |
| 2012/0012671 | A1 | 1/2012 | Brose et al. |
| 2012/0097762 | A1 | 4/2012 | Gehrung et al. |
| 2012/0097765 | A1 | 4/2012 | Drozd |
| 2012/0132550 | A1 | 5/2012 | Gerson et al. |
| 2012/0160935 | A1 | 6/2012 | Krayer et al. |
| 2012/0187220 | A1 | 7/2012 | Micheli et al. |
| 2013/0056556 | A1 | 3/2013 | Schmon et al. |
| 2013/0074864 | A1 | 3/2013 | Nuzzo et al. |
| 2013/0092760 | A1 | 4/2013 | Joseph |
| 2013/0268734 | A1 | 10/2013 | Nolte et al. |
| 2013/0320110 | A1 | 12/2013 | Brose et al. |
| 2013/0327850 | A1 | 12/2013 | Joseph |
| 2014/0034757 | A1 | 2/2014 | Kaneko et al. |
| 2014/0048627 | A1 | 2/2014 | Schmon et al. |
| 2014/0059905 | A1 | 3/2014 | Raming |
| 2014/0145003 | A1 | 5/2014 | Schmon et al. |
| 2014/0263686 | A1 | 9/2014 | Hedger |
| 2014/0305962 | A1 | 10/2014 | Tschan |
| 2014/0339322 | A1 | 11/2014 | Freers |
| 2014/0346257 | A1 | 11/2014 | Reetz, III et al. |
| 2015/0108254 | A1* | 4/2015 | Commette ............ B05B 7/1272 239/428 |
| 2015/0165463 | A1 | 6/2015 | Gehrung |
| 2015/0231655 | A1 | 8/2015 | Adams et al. |
| 2016/0030960 | A1 | 2/2016 | Gehrung |
| 2016/0243567 | A1 | 8/2016 | Brose |
| 2017/0252771 | A1 | 9/2017 | Young |
| 2017/0304852 | A1 | 10/2017 | Bierie |
| 2018/0050355 | A1 | 2/2018 | Delsard |
| 2018/0050356 | A1 | 2/2018 | Gehrung |
| 2018/0050358 | A1 | 2/2018 | Ruda |
| 2018/0050361 | A1 | 2/2018 | Gehrung et al. |
| 2018/0050362 | A1 | 2/2018 | Gehrung et al. |
| 2018/0111142 | A1 | 4/2018 | Joaquim |
| 2018/0133727 | A1 | 5/2018 | Schmon et al. |
| 2018/0200740 | A1 | 7/2018 | Rossbach et al. |
| 2018/0236465 | A1 | 8/2018 | Krayer |

(56) References Cited

U.S. PATENT DOCUMENTS

| | | | |
|---|---|---|---|
| 2020/0038889 | A1 | 2/2020 | Volk et al. |
| 2020/0038892 | A1 | 2/2020 | Volk et al. |
| 2021/0379612 | A1 | 12/2021 | Volk |
| 2022/0048054 | A1 | 2/2022 | Maier |
| 2022/0080448 | A1 | 3/2022 | Volk |
| 2023/0107860 | A1 | 4/2023 | Maier |
| 2023/0149955 | A1 | 5/2023 | Maier |

FOREIGN PATENT DOCUMENTS

| | | | |
|---|---|---|---|
| AT | 250467 | | 10/2003 |
| AT | 322645 | | 4/2006 |
| AT | 383910 | | 2/2008 |
| AT | 461752 | | 4/2010 |
| AT | 461753 | | 4/2010 |
| AT | 475488 | | 8/2010 |
| AU | 637187 | | 5/1993 |
| AU | 2002352235 | | 9/2003 |
| AU | 2004315547 | | 8/2005 |
| AU | 2005205899 | | 8/2005 |
| AU | 2011257605 | | 11/2012 |
| AU | 2011361295 | | 5/2013 |
| CA | 521511 | | 2/1956 |
| CA | 2126957 | | 1/1995 |
| CA | 2277096 | | 7/1998 |
| CA | 2445183 | | 10/2002 |
| CA | 2552390 | | 8/2005 |
| CA | 2555607 | | 8/2005 |
| CA | 2690112 | | 5/2009 |
| CA | 2797990 | | 12/2011 |
| CA | 2812684 | | 9/2012 |
| CA | 102917803 | | 2/2013 |
| CA | 2850401 | A1 | 5/2013 |
| CH | 200754 | A | 10/1938 |
| CH | 203 668 | | 6/1939 |
| CH | 523098 | A | 5/1972 |
| CH | 542104 | A | 9/1973 |
| CH | 676208 | | 12/1990 |
| CN | 2136077 | Y | 6/1993 |
| CN | 1738310 | A | 2/2006 |
| CN | 1899704 | A | 1/2007 |
| CN | 1902002 | | 1/2007 |
| CN | 1909970 | | 2/2007 |
| CN | 1909971 | | 2/2007 |
| CN | 1917960 | | 2/2007 |
| CN | 200954482 | | 10/2007 |
| CN | 101125316 | | 2/2008 |
| CN | 201064746 | Y | 5/2008 |
| CN | 100430150 | | 11/2008 |
| CN | 100455360 | | 1/2009 |
| CN | 101367066 | | 2/2009 |
| CN | 100478080 | | 4/2009 |
| CN | 101516523 | A | 8/2009 |
| CN | 101646500 | | 2/2010 |
| CN | 102211070 | | 4/2011 |
| CN | 102139249 | A | 8/2011 |
| CN | 102211069 | | 10/2011 |
| CN | 202667052 | U | 1/2013 |
| CN | 103 521 378 | A | 1/2014 |
| CN | 203508251 | U | 4/2014 |
| CN | 203737474 | U | 7/2014 |
| CN | 204074345 | U | 1/2015 |
| CN | 204294401 | U | 4/2015 |
| CN | 105377447 | A | 3/2016 |
| CN | 205966208 | U | 2/2017 |
| CN | 107427851 | A | 12/2017 |
| CN | 107666966 | A | 2/2018 |
| CN | 108223901 | A | 6/2018 |
| CN | 207493903 | U | 6/2018 |
| CN | 108438227 | A | 8/2018 |
| DE | 259621 | C | 5/1913 |
| DE | 460381 | | 5/1928 |
| DE | 510362 | C | 10/1930 |
| DE | 611325 | C | 3/1935 |
| DE | 1425890 | | 11/1968 |
| DE | 2559036 | A1 | 9/1976 |
| DE | 2653981 | | 6/1978 |
| DE | 2950341 | | 7/1980 |
| DE | 2926286 | A1 | 1/1981 |
| DE | 3016419 | | 11/1981 |
| DE | 8024829.9 | | 9/1982 |
| DE | 3111571 | A1 | 10/1982 |
| DE | 3238149 | A1 | 4/1984 |
| DE | 34 02 097 | | 8/1985 |
| DE | 3402945 | A1 | 8/1985 |
| DE | 3517122 | | 5/1986 |
| DE | 3505618 | | 8/1986 |
| DE | 3526819 | | 2/1987 |
| DE | 3016419 | C2 | 8/1987 |
| DE | 8702559 | | 10/1987 |
| DE | 3708472 | A1 | 10/1988 |
| DE | 8902223 | | 5/1989 |
| DE | 3742308 | | 6/1989 |
| DE | 8905681 | | 11/1989 |
| DE | G 90 01 265 | | 5/1990 |
| DE | 3906219 | | 8/1990 |
| DE | 4302911 | | 8/1993 |
| DE | 4208500 | A1 | 9/1993 |
| DE | 4230535 | | 3/1994 |
| DE | G 94 16 015.5 | U1 | 11/1994 |
| DE | 4321940 | | 1/1995 |
| DE | 69110099 | T2 | 2/1996 |
| DE | 69211891 | T2 | 10/1996 |
| DE | 19516485 | | 11/1996 |
| DE | 19727884 | | 2/1999 |
| DE | 69505433 | T2 | 4/1999 |
| DE | 19807973 | | 7/1999 |
| DE | 19824264 | | 12/1999 |
| DE | 19832990 | | 1/2000 |
| DE | 20000483 | | 8/2000 |
| DE | 10004105 | | 10/2000 |
| DE | 19958569 | | 2/2001 |
| DE | 199 41 362 | | 3/2001 |
| DE | 19945760 | | 3/2001 |
| DE | 10103221 | A1 | 8/2001 |
| DE | 10031857 | | 1/2002 |
| DE | 10031858 | | 1/2002 |
| DE | 20114257 | | 2/2002 |
| DE | 10059406 | | 6/2002 |
| DE | 10135104 | | 9/2002 |
| DE | 10135104 | C1 | 9/2002 |
| DE | 10205831 | | 8/2003 |
| DE | 10311238 | | 10/2004 |
| DE | 10 2004 027 789 | | 2/2005 |
| DE | 29825120 | | 2/2005 |
| DE | 102004027789 | A1 | 2/2005 |
| DE | 69827994 | T2 | 4/2005 |
| DE | 20320781 | | 6/2005 |
| DE | 10 2004 014 646 | | 7/2005 |
| DE | 10 2004 003 438 | | 8/2005 |
| DE | 102004003439 | | 8/2005 |
| DE | 10 2004 007 733 | | 9/2005 |
| DE | 10 2004 021 298 | | 11/2005 |
| DE | 699 28 944 | T2 | 9/2006 |
| DE | 69535077 | T2 | 11/2006 |
| DE | 202007001031 | | 3/2007 |
| DE | 601 20 633 | T2 | 5/2007 |
| DE | 60200500 1173 | | 8/2007 |
| DE | 60206956 | T2 | 8/2008 |
| DE | 102007006547 | | 8/2008 |
| DE | 102007013628 | A1 | 9/2008 |
| DE | 102007039106 | | 2/2009 |
| DE | 102007052067 | | 5/2009 |
| DE | 10 2008 010 169 | A1 | 9/2009 |
| DE | 20 2010 012 449 | U1 | 12/2010 |
| DE | 202010012449 | | 12/2010 |
| DE | 102009032399 | A1 | 1/2011 |
| DE | 102009053449 | | 2/2011 |
| DE | 102010060086 | | 4/2012 |
| DE | 102010056263 | A1 | 6/2012 |
| DE | 10 2011 100 806 | A1 | 11/2012 |
| DE | 102011106060 | | 1/2013 |
| DE | 20 2013 002 228 | U2 | 5/2013 |
| DE | 102011118120 | | 5/2013 |

(56) References Cited

FOREIGN PATENT DOCUMENTS

| | | | |
|---|---|---|---|
| DE | 10 2011 120 717 | A1 | 6/2013 |
| DE | 112007001824 | B4 | 7/2013 |
| DE | 10 2012 013 464 | A1 | 11/2013 |
| DE | 10 2015 114202 | A1 | 1/2017 |
| DE | 10 2018 118 737 | A1 | 2/2020 |
| DE | 102021124139 | A1 | 3/2023 |
| DE | 102021124140 | A1 | 3/2023 |
| DE | 102021124141 | A1 | 3/2023 |
| EM | 002066910-0001 | | 3/2013 |
| EM | 002066910-0002 | | 3/2013 |
| EM | 002066910-0003 | | 3/2013 |
| EM | 002066910-0004 | | 3/2013 |
| EM | 002066910-0005 | | 3/2013 |
| EM | 002066910-0006 | | 3/2013 |
| EM | 002066910-0007 | | 3/2013 |
| EM | 002066910-0008 | | 3/2013 |
| EM | 002066910-0009 | | 3/2013 |
| EM | 002066910-0010 | | 3/2013 |
| EP | 0092043 | A2 | 10/1983 |
| EP | 0092392 | | 10/1983 |
| EP | 0114064 | A2 | 7/1984 |
| EP | 0313958 | A2 | 5/1989 |
| EP | 524408 | | 1/1993 |
| EP | 567325 | | 10/1993 |
| EP | 0631821 | | 1/1995 |
| EP | 0650766 | | 5/1995 |
| EP | 0650766 | A2 | 5/1995 |
| EP | 678334 | | 10/1995 |
| EP | 0706832 | | 4/1996 |
| EP | 0706832 | A1 | 4/1996 |
| EP | 0710506 | | 5/1996 |
| EP | 801002 | | 10/1997 |
| EP | 0846498 | A1 | 6/1998 |
| EP | 987060 | | 3/2000 |
| EP | 1081639 | | 3/2001 |
| EP | 1106262 | | 6/2001 |
| EP | 1 247 586 | | 10/2002 |
| EP | 1277519 | | 1/2003 |
| EP | 1294490 | | 3/2003 |
| EP | 1299194 | | 4/2003 |
| EP | 1366823 | | 12/2003 |
| EP | 1412669 | | 4/2004 |
| EP | 1424135 | | 6/2004 |
| EP | 1477232 | A1 | 11/2004 |
| EP | 1479447 | A1 | 11/2004 |
| EP | 1504823 | A1 | 2/2005 |
| EP | 1563913 | | 8/2005 |
| EP | 1574262 | | 9/2005 |
| EP | 1602412 | | 12/2005 |
| EP | 1658902 | A1 | 5/2006 |
| EP | 1708822 | | 10/2006 |
| EP | 1708823 | | 10/2006 |
| EP | 1718415 | | 11/2006 |
| EP | 1880771 | A1 | 1/2008 |
| EP | 1902766 | A1 | 3/2008 |
| EP | 1902786 | | 3/2008 |
| EP | 1902876 | | 3/2008 |
| EP | 1930084 | | 6/2008 |
| EP | 1964616 | | 9/2008 |
| EP | 1964616 | A2 | 9/2008 |
| EP | 1987886 | A2 | 11/2008 |
| EP | 1997561 | A2 | 12/2008 |
| EP | 2017010 | A2 | 1/2009 |
| EP | 2027931 | | 2/2009 |
| EP | 1 270 081 | B1 | 3/2009 |
| EP | 2092987 | A1 | 8/2009 |
| EP | 2106298 | | 10/2009 |
| EP | 2111920 | | 10/2009 |
| EP | 2127758 | A1 | 12/2009 |
| EP | 2451586 | A1 | 5/2012 |
| EP | 2490819 | | 8/2012 |
| EP | 2576079 | | 4/2013 |
| EP | 2608890 | | 7/2013 |
| EP | 2 669 213 | A1 | 12/2013 |
| EP | 2703089 | A1 | 3/2014 |
| EP | 2736651 | B1 | 6/2014 |
| EP | 2 828 000 | A | 1/2015 |
| EP | 2 828 000 | A1 | 1/2015 |
| EP | 3184177 | A1 | 6/2017 |
| EP | 2828000 | B1 | 8/2019 |
| FR | 398333 | | 6/1909 |
| FR | 789762 | | 11/1935 |
| FR | 1410519 | | 9/1964 |
| FR | 2444501 | | 7/1980 |
| FR | 2462200 | A1 | 2/1981 |
| FR | 2 570 140 | | 3/1986 |
| FR | 2 774 928 | | 8/1999 |
| FR | 2863512 | A1 | 6/2005 |
| FR | 2927824 | A1 | 8/2009 |
| GB | 190900523 | | 6/1909 |
| GB | 657854 | A | 9/1951 |
| GB | 2 132 916 | | 7/1984 |
| GB | 2153260 | | 8/1985 |
| GB | 2372465 | | 8/2002 |
| GB | 2411235 | | 8/2005 |
| GB | 2416141 | A | 1/2006 |
| GB | 2444909 | A | 6/2008 |
| GB | 2508446 | A | 6/2014 |
| HK | 1100405 | | 6/2009 |
| HK | 1096057 | | 7/2009 |
| HK | 1125067 | | 8/2012 |
| HK | 1138533 | | 11/2012 |
| JP | S49-136868 | U | 11/1974 |
| JP | S55-107258 | U | 7/1980 |
| JP | S5654328 | | 5/1981 |
| JP | S57-75246 | | 5/1982 |
| JP | S57128346 | A | 8/1982 |
| JP | 58-119862 | | 5/1983 |
| JP | S5998757 | | 6/1984 |
| JP | S601722 | | 1/1985 |
| JP | S62160156 | A | 7/1987 |
| JP | H01-87805 | | 6/1989 |
| JP | H02258076 | A | 10/1990 |
| JP | H04-176352 | A | 6/1992 |
| JP | H0530749 | | 4/1993 |
| JP | H05172678 | | 7/1993 |
| JP | 674850 | | 3/1994 |
| JP | H06215741 | | 8/1994 |
| JP | H07204542 | A | 8/1995 |
| JP | H08196950 | | 8/1996 |
| JP | H08196950 | A | 8/1996 |
| JP | H09117697 | | 5/1997 |
| JP | 11-047643 | A | 2/1999 |
| JP | 2000015150 | A | 1/2000 |
| JP | 2000070780 | A | 3/2000 |
| JP | 2001259487 | | 9/2001 |
| JP | 2003042882 | | 2/2002 |
| JP | 2003088780 | | 3/2003 |
| JP | 2004-501763 | A | 1/2004 |
| JP | 2004017044 | | 1/2004 |
| JP | 2003-211034 | A | 5/2004 |
| JP | 2005000735 | A | 1/2005 |
| JP | 2005-052830 | A | 3/2005 |
| JP | 2005138885 | | 6/2005 |
| JP | 2007516831 | | 6/2007 |
| JP | 2008018296 | A | 1/2008 |
| JP | 2008161789 | A | 7/2008 |
| JP | 2010-528837 | A | 8/2010 |
| JP | 2014124274 | A | 7/2014 |
| JP | 2017-135647 | A | 8/2017 |
| JP | 2018-505779 | A | 3/2018 |
| KR | 2014 0064644 | A | 5/2014 |
| RU | 2523816 | C1 | 1/2014 |
| TW | 491092 | | 6/2002 |
| TW | 510253 | U | 11/2002 |
| TW | I220392 | | 8/2004 |
| TW | I303587 | | 12/2008 |
| TW | I309584 | | 5/2009 |
| TW | 201020031 | A | 6/2010 |
| WO | 90/008456 | | 8/1990 |
| WO | 91/16610 | | 10/1991 |
| WO | 1992/07346 | | 4/1992 |
| WO | 9522409 | | 8/1995 |
| WO | 1998/32539 | | 7/1998 |

(56) References Cited

FOREIGN PATENT DOCUMENTS

| | | | |
|---|---|---|---|
| WO | 01/012337 | | 2/2001 |
| WO | 2001/12337 | | 2/2001 |
| WO | 0166261 | | 9/2001 |
| WO | 01/099062 | | 12/2001 |
| WO | 02/000355 | | 1/2002 |
| WO | 0202242 | | 1/2002 |
| WO | 02/018061 | | 3/2002 |
| WO | 02/085533 | | 10/2002 |
| WO | 03/007252 | | 1/2003 |
| WO | 03/045575 | | 6/2003 |
| WO | 03/069208 | | 8/2003 |
| WO | 03069208 | A1 | 8/2003 |
| WO | 03/086654 | A1 | 10/2003 |
| WO | 04/037433 | | 5/2004 |
| WO | 2004/37433 | | 5/2004 |
| WO | 04/052552 | | 6/2004 |
| WO | 05/018815 | | 3/2005 |
| WO | 05/068220 | | 7/2005 |
| WO | 05/070557 | | 8/2005 |
| WO | 05/070558 | | 8/2005 |
| WO | 05/077543 | | 8/2005 |
| WO | 05/115631 | | 12/2005 |
| WO | 2006065850 | | 6/2006 |
| WO | 07/128127 | | 11/2007 |
| WO | 2007133386 | A2 | 11/2007 |
| WO | 2007/149760 | A2 | 12/2007 |
| WO | 2008/093866 | A1 | 8/2008 |
| WO | 2009015260 | | 1/2009 |
| WO | 2009015260 | A2 | 1/2009 |
| WO | 2009/054986 | A1 | 4/2009 |
| WO | 2009056424 | | 5/2009 |
| WO | 2010019274 | A1 | 2/2010 |
| WO | 2010/044864 | A1 | 4/2010 |
| WO | 2011047876 | | 4/2011 |
| WO | 2011147555 | | 12/2011 |
| WO | 2012/013574 | A1 | 2/2012 |
| WO | 2012/052255 | A1 | 4/2012 |
| WO | 2012/119578 | A1 | 9/2012 |
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013/142045 | A1 | 9/2013 |
| WO | 2014/006593 | A1 | 1/2014 |
| WO | 2015/125619 | A1 | 8/2015 |
| WO | 2016/127106 | A1 | 8/2016 |
| WO | 2016/188804 | A1 | 12/2016 |
| WO | 2017/096740 | A1 | 6/2017 |
| WO | 2018/197025 | A1 | 10/2017 |
| WO | 2020/053153 | A | 3/2020 |
| WO | 2020/0053153 | A1 | 3/2020 |
| WO | 2020/086977 | A1 | 4/2020 |

OTHER PUBLICATIONS

Notice of Allowance for U.S. Appl. No. 14/815,210 dated Mar. 25, 2020.
Office Action of U.S. Appl. No. 15/679,461 dated Mar. 31, 2020.
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.
International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 on Feb. 25, 2014 with English translation.
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Response filed May 28, 2019 for U.S. Appl. No. 15/379,972.
Final Office Action for U.S. Appl. No. 15/679,461 dated Jun. 11, 2019.
Final Office Action for U.S. Appl. No. 15/679,533 dated Jul. 12, 2019.
Final Office Action in U.S. Appl. No. 14/113,649 dated Jun. 22, 2017.
Response filed in U.S. Appl. No. 15/143,698 dated Jul. 3, 2017.
Response to Final Office Action, dated Nov. 11, 2019, for U.S. Appl. No. 14/815,210 20 pages.
Office Action, dated Nov. 20, 2019, for U.S. Appl. No. 15/575,549 12 pages.
Office Action, dated Dec. 9, 2019, for U.S. Appl. No. 14/815,210 6 pages.
Response filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
Office Action dated Feb. 5, 2021 for U.S. Appl. No. 16/524,740.
Office Action dated Feb. 5, 2021 for U.S. Appl. No. 16/524,838.
Final Office Action dated May 2, 2022 for U.S. Appl. No. 16/524,740.
Office Action dated Jun. 30, 2017 for U.S. Appl. No. 14/815,210.
For Chinese Patent Application No. 2019800593031 First Office Action dated Apr. 25, 2022 (Eng. translation) Chinese Search Report dated Apr. 19, 2022.
International Preliminary Report on Patentability with Written Opinion dated Mar. 9, 2021 for PCT/EP2019/074000 filed Sep. 9, 2019.
European Search Report dated May 8, 2017 for Application No. EP16203544.
"Spray Guns/sata.com", Oct. 18, 2015, XP055364928 URL:http://web.archive.org/web/20151018205307/http://www.sata.com/index.php?id=lackierpistolen&L=11 [gefunden am Apr. 13, 2017]; reprinted on Dec. 8, 2017.

(56) References Cited

OTHER PUBLICATIONS

"SATAjet 5000 B Lackierpistolen | Bechersysteme | Atemschutz | Filtertechnik | Zubehor So flexibel wie lhre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.
Amendments submitted to European Patent Office on Dec. 3, 2017 for Application No. EP16203544 (with English translation of chart on p. 3).
Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
Notification of the First Office Action with search report dated Aug. 24, 2015 for Chinese Application No. 201280020519.5 (related to U.S. Appl. No. 14/113,649), 13 pages.
Notification of the Second Office Action dated May 16, 2016, for Chinese Application No. 201280020519.5 (related to U.S. Appl. No. 14/113,649), 5 pages.
Japanese Office Action for JP2014-517485 (related to U.S. Appl. No. 14/113,649), dated Jul. 5, 2016, 16 pages.
Final Office Action dated Sep. 23, 2020, for U.S. Appl. No. 15/575,549.
German Search Report dated May 26, 2021, for DE 10 2020 123 769.3, with machine translation.
Final Office Action dated Dec. 7, 2017 for U.S. Appl. No. 14/815,210.
Notice of Allowance dated Sep. 17, 2020 for U.S. Appl. No. 15/679,461.
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
Office Action dated Mar. 30, 2020, for U.S. Appl. No. 15/679,533.
Office Action dated Feb. 19, 2021 for U.S. Appl. No. 15/575,549.
Office Action, dated Jan. 9, 2019, for U.S. Appl. No. 15/679,482.
Search Report dated Feb. 22, 2019 for German Patent Application No. 10 2018 118 738.6.
Search Report dated Feb. 8, 2019 for German Patent Application No. 10 2018 118 737.8.
Notice of Allowance dated Jul. 1, 2019 for U.S. Appl. No. 15/379,972.
Notice of Allowance dated Jul. 9, 2019 for U.S. Appl. No. 15/679,482.
For U.S. Appl. No. 16/524,838: Response and Request for Continued Exam filed Oct. 22, 2021.
German Search Report dated May 7, 2019 for Application No. 10 2018 122 004.9.
Response restriction requirement filed May 23, 2016 for Design U.S. Appl. No. 29/516,082.
Notice of Allowance dated Jul. 26, 2021, for U.S. Appl. No. 15/575,549.
Third Office Action dated Feb. 15, 2023 for Chinese Patent Application No. 20191070444.X.
Response to Final Office Action and RCE dated Nov. 29, 2016 in U.S. Appl. No. 14/113,649.
International Search Report and Written Opinion for PCT/EP2021/054061, filed Apr. 16, 2021.
Zhu Zhifu, "Simulation and Experimental Study on Spray Characteristics of Gas-Assisted Urea Spray Gun", Aug. 6, 2019, pp. 1-6.
International Preliminary Report on Patentability dated Jan. 31, 2023 with Written Opinion for International Application No. PCT/EP2021/071252 filed Jul. 29, 2021.
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
International Preliminary Report on Patentability dated Sep. 6, 2022 with Written Opinion for PCT/EP2021/053940 (English Translation).
International Preliminary Report on Patentability dated Sep. 6, 2022 with Written Opinion for PCT/EP2021/054059 (English Translation).
International Preliminary Report on Patentability dated Sep. 6, 2022 with Written Opinion for PCT/EP2021/054061 (English Translation).
Response filed May 5, 2021 for U.S. Appl. No. 16/524,740.
Response filed May 5, 2021 for U.S. Appl. No. 16/524,838.
International Preliminary Report on Patentability dated Feb. 2, 2021 and Written Opinion for PCT/DE2018/100679 filed Aug. 1, 2018 (English Translation).
Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps:/ /web.archive.org/web/20150127025402lhttp://www.autorefinishdevilbiss.com.spray-gun-setup.aspx.
Anonymous: "DeVilbiss—Spray Gun Tool on the AppStore", Oct. 19, 2015 (Oct. 19, 2015), XP055580448, retrieved from the Internet: URLhttps://itunes .apple.comlus/app/ devilbiss-spray-gun-tool/id590404917?mt=8.
Final Office Action dated Jun. 1, 2021 for U.S. Appl. No. 16/524,740.
Response to Office Action filed Feb. 16, 2016 for U.S. Appl. No. 13/698,417.
Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
Office Action dated Feb. 19, 2016 for U.S. Appl. No. 14/113,649.
Ror German Patent Application No. 19 183 380.5: Office Action dated Nov. 4, 2022 Office Action dated May 19, 2023.
Japanese Office Action dated Sep. 25, 2019 for Japanese Publication No. 2015-149405, 4 pages.
International Search Report dated Apr. 12, 2019 and Written Opinion for PCT/DE18/100679, filed Aug. 1, 2018 (21 pages).
Notice of Allowance dated Jun. 27, 2023 for U.S. Appl. No. 16/524,740.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2014 for U.S. Appl. No. 13/380,949.
Restriction Requirement dated Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012. [online], [site visited Jan. 7, 2015]. <http://www.herkules.us/pdfs/L00761-Hercules-Gun_Washers-4-page-brochure.pdf>.
Jetclean GUn Cleaner Terry's Auto Supply, google publish date Aug. 4, 2011, [online], [site visited Jan. 7, 2015], <http://secure.terrys.net/viewProduct php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 13/698,417.
Notice of Allowance dated Apr. 30, 2015 for U.S. Appl. No. 29/447,887.

(56) References Cited

OTHER PUBLICATIONS

Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for Design U.S. Appl. No. 29/486,232.
Response filed Mar. 31, 2015 to Office Action dated Dec. 31, 2014 for U.S. Appl. No. 13/380,949.
Japanese Office Action dated Jun. 11, 2014 for Japanese Patent Application No. 2012-518769.
Australian Examination Report dated Nov. 11, 2014 for Australian patent Application No. 2011257605.
Japanese Notice of Allowance mailed Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18, 2014 for U.S. Appl. No. 14/113,649.
Application filed Dec. 17, 2014 for U.S. Appl. No. 14/572,998.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.
Application filed Jan. 29, 2015 for Design U.S. Appl. No. 29/516,073.
Application filed Jan. 29, 2015 for Design U.S. Appl. No. 29/516,082.
Application filed Mar. 3, 2015, 2015 for Design U.S. Appl. No. 29/519,198.
Final Office Action dated Jul. 20, 2015 for U.S. Appl. No. 14/113,649.
International Preliminary Report on Patentability for PCT/EP2015/001728 filed Aug. 25, 2015.
Final Office Action dated Mar. 16, 2017 from U.S. Appl. No. 13/698,417, 9 pages.
Response to Election of Species Requirement and Amendment filed Oct. 15, 2018 from U.S. Appl. No. 15/679,482.
Chinese Search Report dated Jul. 18, 2018 for Application No. 2014103745834 filed Jul. 31, 2014.
DesignView of CN302452159 registered Jun. 5, 2013, printed Oct. 18, 2018.
European Search Report, dated Jan. 20, 2020, for European Application No. 19183380.
Husky Gravity Feed HVLP Spray Gun (2016) https://www.homedepot.com/husky-gravity-feed-hvlp-spray-gun-H4840GHVSG/203497519.
Northern Industrial Paint Spray Gund and Hoses (2008) https://www.northerntool.com/products/northern-industrial-paint-spray-gun-and-hoses-158970.
Notification of the Third Office Action dated Feb. 14, 2023 for Chinese Patent Application No. 2019107032612 (15 pages).
Office Action dated Mar. 21, 2023 for European Patent Application No. 19 183 382.1, (12 pages).
Office Action, dated Jan. 15, 2019, for U.S. Appl. No. 15/679,533.
Office Action, dated Jan. 15, 2019, for U.S. Appl. No. 15/679,461.
German Search Report dated Mar. 15, 2016 for Application No. 20 2015 003 664.3, 8 pages.
Chinese Search Report dated Feb. 21, 2019 for Application No. 2016800293781, 3 pages.
International Search Report dated Aug. 31, 2016 for PCT/EP2016/061057 filed May 18, 2016.
Written Opinion for PCT/EP2016/061057 filed May 18, 2016.
Response to Office Action dated Jun. 25, 2018 for U.S. Appl. No. 14/815,210.
Response to Final Office Action dated Aug. 22, 2018 for U.S. Appl. No. 14/113,649.
International Preliminary Report on Patentability, dated Mar. 9, 2021,with Written Opinion for PCT/EP2019/074000, filed Sep. 9, 2019 (English translation) (7 pages).
Decision on Rejection dated Feb. 10, 2023 for Chinese Patent Application No. 2018800961965.
Search Report dated Jan. 30, 2023 for Chinese Patent Application No. 2018800961965.
Restriction/Species requirement dated Dec. 7, 2020 for U.S. Appl. No. 16/524,838.
Final Office Action dated Aug. 12, 2019 from U.S. Appl. No. 14/815,210.
International Search Report dated Apr. 12, 2019 for PCT/DE2018/100679 filed Aug. 1, 2018.
Written Opinion for PCT/DE2018/100679 filed Aug. 1, 2018.
Restriction Requirement dated Mar. 18, 2019, for U.S. Appl. No. 29/596,869.
Office Action dated Mar. 15, 2019, for U.S. Appl. No. 14/815,210.
Final Office Action dated Nov. 23, 2021 for U.S. Appl. No. 15/679,533.
Office Action dated Aug. 12, 2021 for U.S. Appl. No. 15/679,533.
Response to Restriction Requirement filed Oct. 29, 2019 for U.S. Appl. No. 15/575,549.
Response filed Dec. 21, 2015 to Office Action dated Jul. 20, 2015 for U.S. Appl. No. 14/113,649.
RCE Reply filed Oct. 11, 2019 for U.S. Appl. No. 15/679,461.
Search Report for German Application No. 10 2021 124 140.5, filed Sep. 17, 2021.
International Search Report, Written Opinion and International Preliminary Report on Patentability for PCT/EP2022/075664, filed Sep. 15, 2022.
Search Report for German Application No. 10 2021 124 139.1, filed Sep. 17, 2021.
International Search Report, Written Opinion and International Preliminary Report on Patentability for PCT/EP2022/075666, filed Sep. 15, 2022.
For U.S. Appl. No. 17/410,124: Final Office Action dated Mar. 14, 2024.
Final Office Action dated Sep. 12, 2018 in U.S. Appl. No. 14/815,210.
European Search Report dated Jan. 24, 2018 for Application No. 17186905.
Office Action from U.S. Appl. No. 15/143,698 dated Jan. 5, 2017.
German Search Report for German Application No. 10 2015 016 474.0 dated Aug. 9, 2016, 14 pages.
Notice of Allowance in U.S. Appl. No. 29/556,463 filed Mar. 1, 2016, 9 pages.
Notice of Allowance in U.S. Appl. No. 29/555,656 filed Feb. 24, 2016, 5 pages.
Chinese Search Report for Application No. 2017107135569 dated Aug. 24, 2020 and English translation.
For U.S. Appl. No. 15/679,533: Interview Summary dated Jun. 17, 2020 Response to Office Action, filed Jun. 30, 2020.
Office Action dated Jun. 12, 2020, for U.S. Appl. No. 15/575,549.
For Chinese Application No. 201910704447.X: Search Report, dated Aug. 25, 2022 Second Office Action, dated Sep. 1, 2022.
Examination Report from the European Patent Office dated Nov. 8, 2021 for European Patent Application No. 19183382.1.
International Search Report and Written Opinion for PCT/EP2021/54059, filed Feb. 18, 2021.
German Search Report for Application No. 10 2016 009 957.7 dated Apr. 21, 2017.
European Office Action dated Mar. 15, 2024 for European Patent Application No. 21 706 892.3.
European Office Action dated Mar. 7, 2024 for European Patent Application No. 21 706 572.1.

(56) References Cited

OTHER PUBLICATIONS

European Office Action dated Mar. 6, 2024 for European Patent Application No. 21 191 428.8.
European Office Action dated Mar. 14, 2024 for Eiuropean Patent Application No. 21 706 923.6.
For U.S. Appl. No. 17/410,124: Response filed May 8, 2024.
Notice of Allowance dated Aug. 25, 2023 for U.S. Appl. No. 16/524,838.
Second Office Action, dated Aug. 12, 2022, for Chinese Application No. 2018800961965 (English translation).
Search Report, dated Aug. 1, 2022, or Chinese Application No. 2018800961965.
Office Action dated Aug. 7, 2015 for U.S. Appl. No. 13/991,285.
Response to Final Office Action, filed Jan. 4, 2021, for U.S. Appl. No. 15/679,533 (18 pages).
Response to Restriction Requirement, filed Jan. 25, 2021, for U.S. Appl. No. 16/524,740 (9 pages).
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
Japanese Office Action dated Mar. 6, 2024 for Japanese Patent Application No. 2021-537499 (11 pages).
Office Action dated Apr. 25, 2024 for U.S. Appl. No. 17/274,710.
Office Action dated Feb. 24, 2023 for U.S. Appl. No. 16/524,740.
Search Report dated Jan. 29, 2022, for Chinese Patent Appl. No. 201910704447X, with translation.
Final Office Action dated May 12, 2022, for U.S. Appl. No. 16/524,838.
Final Rejection dated Jul. 22, 2021 for U.S. Appl. No. 16/524,838.
Notice of Allowance dated Jan. 27, 2016 for Design U.S. Appl. No. 29/510,723.
Office Action dated Dec. 2, 2022 for U.S. Appl. No. 16/524,838.
International Search Report dated Jul. 14, 2016 for International Application No. PCT/EP2016/000809, filed May 17, 2016.
Written Opinion for International Application No. PCT/EP2016/000809, filed May 17, 2016.
European Search Report dated Feb. 21, 2020 for Application No. 19183382.1.
Response dated Feb. 19, 2020 for U.S. Appl. No. 15/575,549.
Printout from Internet www.ehow.com explaining how to choose a spray gun and stating in item 2 "Nozzle sizes vary between about 1 mm and 2 mm.", printed Sep. 7, 2012 (Exhibit 1023 in IPR 2013-0111).
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012 (Exhibit 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in IPR 2013-0111).
Printout from Internet of p. 28 from current 3Mtm brochure showing Tip/Nozzle/Air Cap Selection Guide with nozzle sizes from 0.5 mm to 3.0 mm., (Exhibit 1027 in IPR 2013-0111).
Decision by EPO regarding opposition proceedings to revoke patent No. 99926841.0-2425/ 1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6—51pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised Mar. 1, 1991 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRielsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al, A conceptual design . . . , Mechatrronics 17 (2007) p. 1-13 (Exhibit 2015 in IPR 2013-0111).
On line ad from Amazon.com printed Oct. 14, 2013 (Exhibit 2017 in IPR 2013-0111).
Rone et al, MEMS-Baed Microdroplet Generation with Integrated Sensing, Comsol, 2011 (Exhibit 2018 in IPR 2013-0111).
Search Report dated Jan. 7, 2022, for Chinese Patent Appl. No. 2018800961965, with translation.
Office Action dated Apr. 26, 2022 for U.S. Appl. No. 15/679,533.
Office Action dated Jan. 25, 2019 for U.S. Appl. No. 15/379,972.
Notification of the Second Office Action dated Aug. 26, 2022 for Application No. 2019107032612.
Office Action dated Nov. 24, 2021 for U.S. Appl. No. 16/524,740.
Examination Report from the European Patent Office dated Nov. 23, 2021 for European Patent Application No. 19183380.5.
Office Action dated Dec. 9, 2021 for U.S. Appl. No. 16/524,838.
Search Report dated Jan. 26, 2022, for Chinese Patent Appl. No. 2019107032612 with translation.
Final Office Action dated Sep. 4, 2020 for U.S. Appl. No. 15/679,533.
Japanese Office Action dated Jun. 28, 2023 for Japanese Patent Application No. 2021-537499 with translation.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.
European Search Report dated Feb. 4, 2022 for Application No. 21191428.8.
Response to Restriction Requirement filed in U.S. Appl. No. 14/815,210 dated Jun. 19, 2017.
For U.S. Appl. No. 16/524,740: Interview Summary and Advisory Action dated Aug. 30, 2021.
Written Opinion dated Sep. 8, 2016 for International Application No. PCT/EP2016/061057 filed May 18, 2016.
Notice of Allowance dated Apr. 18, 2016 for U.S. Appl. No. 14/572,998.
Response filed Apr. 27, 2016 to Office Action dated Jan. 29, 2016 for U.S. Appl. No. 13/380,949.
German Search Report dated Apr. 12, 2016 for related German Application No. 10 2015 008 735.5.
Final Office Action dated Feb. 27, 2020 for U.S. Appl. No. 15/575,549.
Re U.S. Appl. No. 17/410,124: Office Action dated Oct. 30, 2023.
German Search Report dated Apr. 21, 2017 for application No. 10 2016 009 957.7.
International Search Report dated Nov. 13, 2019 for PCT/EP2019/074000, filed Sep. 9, 2019.
Written Opinion or PCT/EP2019/074000, filed Sep. 9, 2019.
International Search Report and Written Opinion for PCT/EP2021/53940, filed Feb. 18, 2021.

(56) References Cited

OTHER PUBLICATIONS

International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
May 22, 2018 Final Office Action for U.S. Appl. No. 14/113,649.
Jun. 25, 2018 Response to Office Action for U.S. Appl. No. 14/815,210.
Second Chinese Office Action dated Jun. 24, 2015 for Chinese Application No. 2011800266029.
Third Chinese Office Action dated Nov. 30, 2015 for Chinese Application No. 2011800266029.
Final Office Action dated Aug. 29, 2016 for U.S. Appl. No. 14/113,649.
Office Action dated Nov. 2, 2016 for U.S. Appl. No. 11/949,122.
Office Action dated Mar. 29, 2023 for U.S. Appl. No. 17/264,372.
Office Action for U.S. Appl. No. 14/815,210 , dated Apr. 3, 2018.
Response for U.S. Appl. No. 14/113,649, filed Mar. 3, 2018.
German Search Report dated Apr. 10, 2018 for Application No. 10 2017 118 599.2.

* cited by examiner

SPRAY GUN, IN PARTICULAR A PRESSURIZED AIR ATOMIZATION PAINT SPRAY GUN, IN PARTICULAR A HAND-HELD PRESSURIZED AIR ATOMIZATION PAINT SPRAY GUN

FIELD OF THE INVENTION

The invention relates to a spray gun, in particular a pressurized air atomization paint spray gun, in particular a hand-held pressurized air atomization paint spray gun.

BACKGROUND

Spray guns, in particular paint spray guns, operate using various pressurizing methods. Conventional spray guns operate at relatively high spray pressures of several bar. In so-called HVLP guns, the internal nozzle pressure is at most 10 psi or 0.7 bar, as a result of which transmission rates of far beyond 65% are achieved. Compliant spray guns, in turn, have an internal nozzle pressure of more than 10 psi or 0.7 bar but likewise achieve a transmission rate of more than 65%.

The internal nozzle pressure of the spray gun is understood to mean the pressure that prevails in the air cap of the spray gun. The atomization air region here is often separated from the horn air region, and a different pressure may prevail in the atomization air region than in the horn air region. However, the pressures in the atomization air region and in the horn air region may also be identical.

According to the prior art, a spray gun, in particular a paint spray gun, in particular a pressurized air atomization paint spray gun, on the head of the latter has a material nozzle which is screwed into the gun body. The material nozzle on the front end thereof often has a hollow-cylindrical plug, the material to be sprayed exiting the front port of said plug during the operation of the spray gun. However, the material nozzle in the front region thereof can also be of a conical design. The gun head typically has an external thread by way of which an air nozzle ring having an air cap disposed therein is screwed to the gun head. The air cap has a central opening with a diameter larger than the external diameter of the material nozzle plug, or the external diameter of the front end of a conical material nozzle, respectively. The central opening of the air cap and the plug, or the front end of the material nozzle, respectively, conjointly form an annular gap. The so-called atomization air, which in the nozzle assembly described above generates negative pressure on the end face of the material nozzle as a result of which the material to be sprayed is suctioned out of the material nozzle, exits this annular gap. The material to be atomized is fed to the atomization air and shredded so as to form threads and strips. These threads and strips disintegrate by virtue of their hydrodynamic instability, the interaction between the rapidly flowing compressed air and the ambient air, as well as by virtue of aerodynamic disturbances, and form droplets which are blown away from the nozzle by the atomization air.

The air cap furthermore often has two horns which are diametrically opposed and in the outflow direction project beyond the annular gap mentioned and the material outlet opening. Two supply bores, i.e. horn air feed ducts, run from the rear of the air cap to horn air bores in the horns. Each horn typically has at least one horn air bore; however, each horn preferably has at least two horn air bores from which the horn air exits. The horn air bores are typically oriented such that said horn air bores point toward the nozzle longitudinal axis behind the annular gap, when viewed in the exiting direction, so that the so-called horn air exiting the horn air bores can influence the air that has already exited the annular gap, or the paint jet or the paint mist which has already been at least partially created, respectively. As a result, the paint jet, or else the spray jet, with an originally circular cross section (round jet) is compressed on the sides of said jet that face the horns and elongated in the direction perpendicular thereto. Created as a result is a so-called broad jet which permits a high surface painting rate. Besides deforming the spray jet, the horn air causes further atomization of the spray jet.

Air ducts are typically incorporated in the gun body, i.e. the main body of the spray gun, wherein air from one of the ducts, as described above, for use as atomization air is directed to the annular gap mentioned, and air from another duct, as described above, for use as horn air is directed to the horn air openings mentioned. To this end, the air ducts open out in an end face of the head of the gun body and by way of an air distributor assembly directed to the annular gap, or the horn air bores, respectively. The air distributor assembly often comprises an air distributor ring which mutually separates the atomization air region and the horn air region.

A so-called follower is typically disposed, in particular pressed, on the paint needle which closes the material nozzle, or the material outlet opening of the material nozzle, respectively, a trigger engaging on said follower when activated by the user of the spray gun and as a result moving the material needle rearward and out of the material outlet opening of the material nozzle, as a result of which the material outlet opening is released for the material to be sprayed. The more intensely the trigger is activated, the further the paint needle is moved out of the material outlet opening. A detent typically delimits the movement of the trigger and thus the movement of the paint needle. The trigger is activated to the maximum and the material nozzle is completely opened in the so-called full-trigger situation, so that the maximum possible quantity of material to be sprayed can be suctioned out of the material nozzle, as described above, and fed to the atomization air. When the trigger is partially or completely released, the trigger and the material needle, in most instances by virtue of a respective compression spring, move counter to the activation direction back to the non-activated initial position of said trigger and material needle. While this has the advantage that the trigger has to be actively moved, i.e. depressed, only in one direction, the disadvantage lies in that the user of the spray gun always has to activate the trigger counter to the force of the compression springs. This is very tedious in particular in the case of comparatively long painting jobs.

Therefore, EP 2 127 758 A1 proposes a spray gun in which, when activating the trigger 5, a needle 4 is pushed rearward by the trigger 5, on the one hand, and air by way of a bifurcation 21 flows into a cylinder 17 having a piston 16, on the other hand, wherein the piston 16 is connected to a needle 4. The piston 16, by the impingement with air, assists the trigger when activating the needle 4.

It is disadvantageous in this prior art that the construction is relatively complicated and the activation of the trigger, which still takes place in a primarily mechanical manner, continues to be tiring for the user.

SUMMARY OF THE INVENTION

One aspect of the present invention relates to a spray gun which is of a simple construction and by means of which working with less fatigue is possible than by means of spray guns according to the prior art.

Accordingly, disclosed herein are embodiments of a spray gun, in particular a pressurized air atomization paint spray gun, in particular a hand-held pressurized air atomization paint spray gun, which has at least one air valve, in particular an air valve able to be activated by means of at least one activation element, in particular by means of at least one trigger, having at least one valve inlet region and at least one valve outlet region, wherein the spray gun has at least one material valve, in particular for material to be sprayed, and wherein the at least one material valve is designed in such a manner that said material valve is able to be pneumatically activated, in particular opened, in particularly able to be activated, in particular opened, exclusively pneumatically, in particular wherein said material valve is able to be activated, in particular opened, by means of air from the at least one valve outlet region, in particular that said material valve is able to be activated, in particular opened, exclusively by means of air from the at least one valve outlet region.

The spray gun can be in particular a flow-cup gun, a hanging-cup gun, a side-cup gun or a pressure-fed gun. The spray gun can in particular be able to be used for spraying liquid media, in particular paint or lacquer. A pressurized air atomization paint spray gun is to be understood to mean a paint spray gun in which the spray medium is atomized by means of compressed air, as described above. As a result thereof, pressurized air atomization paint spray guns are distinguished from so-called airless guns in which the spray medium is atomized in that the latter is squeezed through a very small opening, and from so-called air-assisted airless guns in which compressed air is used for post-atomization and/or for forming the spray jet. Of course, the present invention can also be used in airless guns and air-assisted airless guns, in particular because above all the trigger force to be applied for the initial activation of the trigger is very high in these types of guns. Hand-held paint spray guns are spray guns which during use are held and guided by a human hand. As a result thereof, hand-held paint spray guns are distinguished from so-called automatic spray guns and robotic spray guns which are installed in a paint shop and/or guided by a painting robot. The spray gun can be designed for spraying one component or else for spraying a plurality of components. This may be an internally mixing or an externally mixing spray gun.

The spray gun according to the invention has an air valve, wherein an air valve in the present case is generally understood to be a component for controlling the flow rate of air. In the present case, all types of shut-off elements are included in the term valve, in particular also slides, flaps, taps or other components by means of which a volumetric flow can be controlled.

The air valve is particularly preferably able to be activated, in particular opened and/or closed, by means of at least one activation element, in particular by means of at least one trigger. This means that an activation element, which can preferably be designed like or similar to a spray gun trigger according to the prior art, or else in the form of a rotating button, a lever or any other operating element, or may have such a rotating button, lever or operating element, is activated, in particular depressed, pulled, rotated, whereupon the air valve carries out an action, in particular opens or closes, either completely or partially.

The air valve has at least one valve inlet region and at least one valve outlet region, wherein the valve inlet region can generally be understood to be a region, a portion, a duct, a chamber or similar which is disposed upstream of the closure part of the air valve, in particular from which air is fed from the closure part of the air valve, in particular from which air flows to the closure part of the air valve. The valve outlet region can generally be a region, a portion, a duct, a chamber or similar which is disposed downstream of the closure part of the air valve, and which is fed air from the open closure part of the air valve, in particular into which air from the open closure part of the air valve flows.

The spray gun according to the invention furthermore has at least one material valve, in particular for material to be sprayed. The material valve can be designed like or similar to a material nozzle according to the prior art, and/or have a material nozzle or a component of similar design. The material valve preferably has a closure part which opens and/or closes either completely or partially the passage through the material valve, and which can be designed as a material needle as known in the prior art or in a similar manner thereto, for example. However, the closure part can also be designed as a cover, ball, slide, flap or similar, in particular as a different shut-off element, and/or have such a component. The material valve is in particular designed in such a manner that the flow rate, in particular the volumetric flow, of a material to be sprayed by the spray gun can be controlled, in particular the quantity, in particular the volumetric flow, of the material to be sprayed and exiting the material valve. The present material valve can form the material outlet of the spray gun, similar to the material nozzle of a spray gun according to the prior art; however, said present material valve can also be disposed upstream of a material outlet of the spray gun.

The at least one material valve is designed in such a manner that said material valve is able to be pneumatically activated, in particular opened, in particular able to be activated, in particular opened, exclusively pneumatically. This means in particular that the material valve and/or a closure part of the material valve is imparted a status change, in particular is moved, by air, in particular compressed air, in particular initiated or caused by air, in particular compressed air. The pneumatic activation can also comprise holding the material valve and/or a closure part of the material valve. The air can in particular generate a force acting in particular on the material valve and/or a closure part and/or on a part connected thereto, as a result of which the material valve and/or the closure part of the material valve are imparted a status change, in particular are moved. For example, the air can flow to, in particular onto, a material valve and/or a closure part and/or onto a part connected thereto, and as a result activate the material valve. Additionally or alternatively, an air pressure can be applied to a material valve and/or a closure part and/or on a part connected thereto, as a result of which the material valve is activated. In particular when the force which by the air is exerted on the material valve and/or a closure part and/or on a part connected thereto is changed, in particular when the flow, in particular the volumetric flow, onto the material valve and/or a closure part and/or onto a part connected thereto, is changed, in particular is increased or decreased, and/or when the air pressure prevailing on the material valve and/or a closure part and/or on a part connected thereto is changed, this typically causes a status change, in particular a movement, in the material valve and/or in the closure part of the material valve. If the force exerted by the air on the material valve and/or a closure part and/or on a part connected thereto remains constant, the material valve and/or the closure part of the material valve preferably remains in a specific state, in particular the material valve can remain in a specific activation state.

The activation of the material valve preferably takes place exclusively by air, in particular compressed air, in particularly exclusively by the action of air. This means that air exclusively initiates the status change in the material valve and/or in the closure part of the material valve, in particular that air exclusively generates the force in particular acting on the material valve and/or a closure part of the material valve and/or on a part connected thereto, as a result of which the material valve and/or the closure part of the material valve are/is imparted the status change, in particular are/is moved. This means that there is at least one portion present in the chain of action between the activation element and the material valve in which no mechanical components act on one another, but only air acts on the material valve and/or a closure part of the material valve and/or on a part connected thereto in such a manner that the status change described arises, in particular that the material valve is activated, in particular opened. Of course, the activation element can indeed first act on a mechanical component, and the material valve and/or a closure part of the material valve can indeed likewise be connected to a mechanical component which is relevant to the chain of action. However, an action, in particular a force therebetween is generated exclusively by air, in particular compressed air.

As a result of the activation of the material valve, wherein the activation presently preferably means the opening, in particular the complete and/or partial opening, of the valve, a passage for material to be sprayed can in particular be achieved. Additionally or alternatively, the activation of the material valve can lead to the material valve being closed, i.e. for blocking and/or throttling a passage for material to be sprayed.

The material valve is preferably able to be activated, in particular opened, by means of air from the at least one valve outlet region. Said material valve is particularly preferably able to be activated, in particular opened, exclusively by means of air from the at least one valve outlet region. The material valve is in particular able to be activated, in particular opened, by means of air which is fed to the material valve and/or a component connected to the material valve from or by way of the at least one valve outlet region. The material valve is in particular able to be activated, in particular opened, by means of air which flows from the at least one valve outlet region. The air can in particular flow into the material valve and/or into a component connected to the material valve in order for the material valve to be activated, in particular opened. As has already been mentioned, activating the material valve can additionally or alternatively mean closing the material valve.

The quantity of air flowing from the at least one valve inlet region into the at least one valve outlet region can be determined by the position of the activation element, in particular, the quantity of air flowing from the at least one valve inlet region into the at least one first valve outlet region can be determined by the position of the activation element within a first position portion of the activation element, described in more detail hereunder, and/or within a second position portion of the activation element, described in more detail hereunder.

As a result of the design embodiment according to the invention, the force to be applied by the user of the spray gun for activating the activation element is significantly lower than in spray guns according to the prior art.

Advantageous design embodiments are disclosed herein.

The spray gun according to the invention is preferably designed in such a manner that the material valve can assume at least one first terminal position in which the material valve is closed, and one second terminal position in which the material valve is completely opened, in particular that said material valve can assume at least one first terminal position in which the material valve is closed, one second terminal position in which the material valve is completely opened, and at least one intermediate position in which the material valve is partially opened, and that the activation element can assume at least one first terminal position in which the activation element is non-activated, and one second terminal position in which the activation element is completely activated, in particular that said material valve can assume at least one first terminal position in which the activation element is non-activated, one second terminal position in which the activation element is completely activated, and at least one intermediate position in which the activation element is partially activated, wherein the position of the activation element determines the position of the material valve. This can mean in particular that the material valve is closed in the case of a non-activated activation element, that the material valve is partially opened in the case of a partially activated activation element, and/or that the material valve is completely opened in the case of a completely activated activation element.

The spray gun is particularly preferably designed in such a manner that the material valve by means of the activation element, at least in a position portion of the activation element, is adjustable in a stepless manner and/or in steps. This means that the status, in particular the activation status, in particular the degree of activation, in particular the position of the activation element, determines the status, in particular the activation status, in particular the degree of activation, in particular the position of the material valve and/or of a closure part of the material valve. In addition to the explanations above pertaining to the material valve being closed in the case of a non-activated activation element, being partially opened in the case of a partially activated activation element and/or being completely opened in the case of a completely activated activation element, this means, for example, that in the case of an activation element activated by 20% the material valve is likewise activated, in particular opened, by 20%, that in the case of an activation element activated by 30% the material valve is likewise activated, in particular opened by 30%, that in the case of an activation element activated by 70% the material valve is likewise activated, in particular opened, by 70%, etc. The activation element and the material valve can in each case continually change, or said activation element and material valve can in each case assume individual steps. It is conceivable that both change continually or both change in steps, and it is conceivable that the activation element changes continually and the material valve changes in steps, or vice versa. An activation of the activation element by 20%, 30%, 70%, etc. can in particular be understood to mean that the activation element has traveled 20%, 30%, 70%, etc. of the activation path thereof, in particular of the path thereof between the non-activated position and the completely activated position. An activation of the material valve by 20%, 30%, 70%, etc. can in particular be understood to mean that a material needle that closes the material valve, in particular the material nozzle, has traveled 20%, 30%, 70%, etc. of the activation path thereof, in particular the path thereof between a first terminal position in which the material needle closes a material outlet opening of the material valve and the material valve is closed and a second terminal position in which the material needle has exited the material outlet opening of the material valve to the maximum and the material valve is completely opened. However, this can also mean that the flow cross section of a material outlet opening of the material valve is opened by 20%, 30%, 70%, etc. However, other manifestations of the statuses, in particular of the activation statuses, in particular of the degrees of activation, in particular the positions of the material valve and/or of a closure part of the material valve, are also conceivable.

The material valve by means of the activation element is particularly preferably adjustable in a stepless manner and/or in stages only in a specific position portion of the activation element. In particular, the material valve in a first position portion of the activation element, which is defined, in particular delimited, by a first terminal position of the activation element in which the activation element is non-activated, and a first intermediate position of the activation element in which the activation element is partially activated, may not be adjustable by means of the activation element, whereas said material valve in a second position portion of the activation element, which is defined, in particular delimited, by a first intermediate position of the activation element in which the activation element is partially activated, and a terminal position of the activation element in which the activation element is completely activated, may be adjustable in a stepless manner and/or in stages. The second position portion of the activation element particularly preferably follows directly the first position portion in the activation direction.

The spray gun according to the invention is preferably designed in such a manner that the position of the material valve, at least in a position portion of the activation element, continually changes as a function of the variation of the position of the activation element, preferably changes so as to be substantially proportional to the position of the activation element, preferably in both activation directions.

The position of the material valve continually changing as a function of the variation of the position of the activation element presently means that the position of the material valve always changes when the position of the activation element changes. This is preferably the case at least in one position portion of the activation element, preferably in the second position portion of the activation element described above.

The position of the material valve in both activation directions continually changing as a function of the variation of the position of the activation element means that the position of the material valve continually changes as a function of the variation of the position of the activation element when activating the activation element as well as when releasing the activation element. Releasing is presently understood to generally mean actively or passively returning the activation element to the non-activated position, or to the non-activated status. This is associated with actively or passively returning the material valve to the closed status.

The position of the material valve preferably changes so as to be substantially proportional to the position of the activation element. This can mean, for example, that a material needle that closes the material valve, in particular the material nozzle, moves out of the material outlet opening by 2 mm when the activation element is moved by 2 mm, said material needle moves out of the material outlet opening by 4 mm when the activation element is moved by 4 mm, said material needle moves out of the material outlet opening by 7 mm when the activation element is moved by 7 mm, etc., this corresponding to a proportionality factor of 1. This can however also mean that the material needle moves out of the material outlet opening by 2 mm when the activation element is moved by 4 mm, said material needle moves out of the material outlet opening by 3 mm when the activation element is moved by 6 mm, said material needle moves out of the material outlet opening by 4 mm when the activation element is moved by 8 mm, etc., this corresponding to a proportionality factor of 0.5. However, larger or smaller proportionality factors are also conceivable.

A profile having a steeper or flatter gradient as the degree of activation of the activation element increases is also conceivable instead of a linear correlation between the variation of the position of the material valve and the variation of the position of the activation element.

The position of the material valve and/or the position of the activation element presently as well as above, besides being understood as meaning the actual position, can also be understood to generally mean a status, in particular an activation status, in particular a degree of activation of the material valve, or of the activation element, respectively, and/or a degree of activation of a closure part of the material valve.

The material valve of the spray gun according to the invention particularly preferably has at least one material needle and one material outlet opening which is able to be closed by means of the material needle, wherein the spray gun is designed in such a manner that the material needle by activating the activation element, in particular the trigger, is able to be moved out of the material outlet opening, wherein activating the activation element, in particular the trigger, over a first distance generates a movement of the material needle over a second distance, and wherein the second distance is a function of the first distance, in particular wherein the second distance equals the first distance, in particular wherein the second distance at least within a position portion of the activation element is a function of and/or equals the first distance. The explanations above apply here in an analogous manner. The position portion mentioned is preferably the second position portion mentioned above.

The material valve preferably has at least one material needle and one material outlet opening which is able to be closed by means of the material needle, wherein a material valve activation element, designed as a piston, of a material valve activation device is disposed on the material needle, wherein the piston is movably disposed within a material valve activation cylinder, and wherein the piston is designed in such a manner that said piston is able to be activated by air, in particular by air from at least one valve outlet region, in particular that said piston is able to be activated exclusively by air, in particular by air from at least one valve outlet region. The material valve activation device can be designed as part of the material valve, or as a separate device. Air, in particular air from at least one valve outlet region, in particular from the valve outlet region described above, in particular air which is fed to the piston from the valve outlet region, in particular air which from the valve outlet region flows to the piston, preferably exerts a force directly on the piston, whereupon the piston, including the material needle on which said piston is disposed, moves in a direction facing away from the material outlet opening, as a result of which the material needle releases the material outlet opening and thus opens the material valve. The piston can preferably delimit an air chamber; said piston can in particular be designed as a displaceable wall of an air chamber, so to speak. Air is fed to this air chamber, the pressure in the chamber increases, and the air piston is moved.

The spray gun according to the invention preferably has at least one second air valve having at least one second valve inlet region and at least one second valve outlet region, wherein the at least one second air valve is able to be activated by means of at least one activation element, in particular able to be activated by the first air valve by means of the activation element. The second air valve can be designed, for example, as a separate air valve in particular connected in series to the first air valve described above. The two air valves can share a common valve piston which, when activating a common activation element, moves, in particular opens and/or closes, the closure parts of the air valves. Of course, a first air valve and a second air valve can also be connected in parallel and/or be able to be activated by means of different activation elements.

The spray gun according to the invention preferably has at least one second air valve, in particular a second air valve which is disposed upstream of the first air valve and has at least one second valve outlet region, in particular at least one second valve outlet region which is disposed between the first air valve and the second air valve, in particular at least one second valve outlet region which opens into at least one air outlet opening of the spray gun, in particular into at least one atomization air outlet opening and/or into at least one forming-air outlet opening and/or at least one transport-air outlet opening. The above explanations pertaining to the first air outlet region apply in an analogous manner to the second air outlet region. The second valve outlet region can also generally be a region, a portion, a duct, a chamber or similar which is disposed downstream of the closure part of the second air valve and which is fed air from the open closure part of the second air valve, in particular into which air from the open closure part of the second air valve flows. The second air valve, like the first air valve, preferably also has at least one valve inlet region, wherein this second valve inlet region can also generally be a region, a portion, a duct, a chamber or similar which is disposed upstream of the closure part of the second air valve, in particular from which air is fed to the closure part of the second air valve, in particular from which air flows to the closure part of the second air valve. The first air valve and the second air valve at least in portions particularly preferably share a common valve inlet region. The second valve outlet region, at least in regions, can preferably also be designed or serve as a first valve inlet region, respectively. The following components are particularly preferably disposed successively in the downstream direction: a common first and second valve inlet region; a closure part of the second air valve; a second valve outlet region which at least in the initial region is simultaneously designed or serves as the end region of the first valve inlet region, respectively, and from which an appended second valve outlet region branches off; a closure part of the first air valve; second valve outlet region.

The second valve outlet region preferably opens into at least one air outlet opening of the spray gun, in particular into at least one atomization air outlet opening and/or into at least one forming-air outlet opening and/or at least one transport-air outlet opening. The atomization air outlet opening is an outlet opening, in particular in an air nozzle of the spray gun, which is designed in such a manner that a spray medium is able to be atomized by means of the air, the so-called atomization air, flowing out of said outlet opening. The forming-air outlet opening is an outlet opening, in particular in an air nozzle of the spray gun, which is designed in such a manner that the shape of a spray jet is able to be changed by means of the air, the so-called forming air, flowing out of said outlet opening. The transport-air outlet opening is an outlet opening, in particular in an air nozzle of the spray gun, which is designed in such a manner that an atomized spray medium is able to be moved away from the spray gun in the direction of an object to be coated by means of the air, the so-called transport air, flowing out of said outlet opening. The outlet openings are particularly preferably incorporated in the same air nozzle. The second valve outlet region at least in regions is preferably designed as an air duct, or as an air duct assembly assembled from a plurality of, in particular bifurcating, air ducts.

The spray gun according to the invention is preferably designed in such a manner that, when activating the activation element within a first position portion of the activation element, a first air valve between at least one first valve inlet region and at least one first valve outlet region is closed, and at least one second air valve between at least one second valve inlet region and at least one second valve outlet region is opened, and that, when activating the activation element within a second position portion of the activation element, the first air valve between the at least one first valve inlet region and the at least one first valve outlet region is opened and the second air valve between the at least one second valve inlet region and the at least one second valve outlet region is opened.

The first position portion of the activation element mentioned is preferably the first position portion of the activation element described above, which is defined, in particular delimited, by a first terminal position of the activation element in which the activation element is non-activated, and a first intermediate position of the activation element in which the activation element is partially activated.

The second position portion of the activation element mentioned is preferably the second position portion of the activation element described above, which is defined, in particular delimited, by a first intermediate position of the activation element in which the activation element is partially activated, and a terminal position of the activation element in which the activation element is completely activated.

The first air valve is preferably the air valve first described above; the first valve inlet region is preferably the valve inlet region first described above; the at least one first valve outlet region is preferably the valve outlet region first described above; the second air valve is preferably the second air valve described above; the second valve inlet region is preferably the second valve inlet region described above; and the second valve outlet region is preferably the second valve outlet region described above.

While activating the activation element, the second air valve between at least one second valve inlet region and at least one second valve outlet region thus first opens. The air flowing from the at least one second valve inlet region into the at least one second valve outlet region by way of the open second air valve can in particular serve as so-called preliminary air. As has already been mentioned above, the second valve outlet region preferably opens into at least one air outlet opening of the spray gun, in particular into at least one atomization air outlet opening and/or into at least one forming-air outlet opening and/or at least one transport-air outlet opening. The spray gun in this first position portion of the activation element only ejects air but no paint. The preliminary air flows in particular out of the atomization air outlet opening. It is prevented by the preliminary air that large, insufficiently atomized paint drops are ejected onto the object to be coated. The first air valve also opens only in a second position portion of the activation element, whereupon air from the at least one first valve inlet region can flow into the at least one first valve outlet region by way of the open first air valve. The material valve can thereupon be pneumatically activated, in particular opened, in particular by air from the first valve outlet region. The second air valve also remains open in the second position portion of the activation element, so that the material to be sprayed can be suctioned out of the material outlet opening of the material valve and fed to the atomization air. When the activation element is released, the first air valve and thus the material valve again close first, while the second air valve remains open. It is prevented as a result that comparatively large quantities of material to be sprayed remain on the material valve, in particular in the material outlet opening of the material valve, and clog the material valve. The second air valve will also close only once the activation element has returned to the non-activated position thereof, or just briefly prior thereto.

A first air valve is preferably integrated in a second air valve. This can mean that a single component, or a single assembly, can assume the function of a first air valve, in particular of the first air valve described above, as well as the function of a second air valve, in particular of the second air valve described above.

A first air valve is particularly preferably formed by at least part of the main body of the spray gun and by a valve piston, in particular by a valve piston which has at least one clearance, in particular a clearance that is enlarged in the direction of at least one activation element of the spray gun, and is in particular disposed between the activation element and a closure part, in particular an air valve head, of a second air valve, and/or a second air valve is formed by at least part of the main body of the spray gun and by a closure part, in particular an air valve head.

For example, an air valve can have a valve piston and a closure part, in particular an air valve head, disposed thereon, wherein the valve piston is mounted so as to be movable axially in a valve piston receptacle duct, in particular in a valve piston receptacle bore. The valve piston receptacle duct has approximately the same diameter as the valve piston, and the valve piston is disposed in a sealing manner in the valve piston receptacle duct. A short duct portion having a somewhat larger diameter than the diameter of the valve piston receptacle duct is situated upstream of the valve piston receptacle duct. An upstream edge of this duct portion can function as the valve seat for the closure part, in particular the air valve head. This closure part, in particular this air valve head, and the valve seat formed by the main body of the spray gun can form a second air valve. A region of the valve piston which does not have any clearance and preferably bears in a sealing manner on the wall of the valve piston receptacle duct is situated between the closure part and the clearance in the valve piston. This region of the valve piston, conjointly with the wall of the valve piston receptacle duct, the latter being part of the main body of the spray gun, can form a first air valve. In order to improve the tightness between the valve piston and the wall of the valve piston receptacle duct, in particular of the main body of the spray gun, sealing elements can be disposed between the valve piston and the wall of the valve piston receptacle duct, in particular so as to be directly upstream of the clearance in the valve piston and in a region of the valve piston that faces away from this sealing element.

The spray gun according to the invention and/or the material valve of the spray gun according to the invention preferably have/has a material valve activation device, wherein the material valve activation device has at least one air inlet, one air outlet and an intervening air chamber, wherein the air chamber on at least one side is delimited by at least one material valve activation element for activating, in particular for opening and/or closing, the material valve, wherein the spray gun and/or the material valve activation device are/is designed in such a manner that the pressure in the air chamber is determined at least by the quantity of air fed to the air chamber by way of the air inlet, in particular by the quantity of air which is fed to the air chamber by way of the air inlet and is able to be controlled by way of the activation element, in particular that the pressure in the air chamber is determined at least by the quantity of air fed to the air chamber by way of the air inlet, and by at least one air outlet valve, in particular an air outlet valve disposed in the air outlet, in particular a throttle valve and/or a pressure relief valve.

In the case of a non-activated activation element, the ambient pressure substantially prevails in the air chamber of the material valve activation device. When the activation element is activated, in particular in a second position portion of the activation element described above, air from the air inlet of the material valve activation device flows into the air chamber of the material valve activation device, as a result of which the pressure in the air chamber rises. The material valve activation element for activating, in particular for opening and/or closing, the material valve, which delimits the air chamber on at least one side, by virtue of the aforementioned is moved away from the non-activated terminal position thereof. The material valve is activated, in particular opened, as a result of this movement; in particular, a material needle can be moved out of the material outlet opening of a material nozzle. The more air flows into the air chamber, the higher the pressure in the air chamber and the further the material valve activation element moves. Once the material valve activation element has reached the second, presently completely activated, terminal position thereof, the material valve is thus completely activated, in particular completely opened. Any further increase in the pressure in the chamber would not have any further effect on the material valve activation element and the material valve. Therefore, the air outlet valve of the material valve activation device is designed in such a manner that said air outlet valve above a specific pressure within the chamber discharges air from the air chamber. For this purpose, an air outlet valve, in particular a throttle valve and/or a pressure relief valve, can in particular be disposed in the air outlet. The pressure in the air chamber above which the air outlet discharges air from the air chamber, in particular the pressure in the air chamber above which the air valve of the air outlet opens, is particularly preferably somewhat higher than the pressure by way of which the material valve activation element is pushed to the completely activated terminal position thereof and held therein. This is the situation in the case of a completely activated activation element, in particular when the trigger is fully pulled, whereby the maximum quantity of air flows through the completely opened air valve, in particular the completely opened first air valve. The quantity of air presently is in particular a volumetric flow of air. In this situation, there is an equilibrium between air flowing into the air chamber and air flowing out of the air chamber, i.e. the volumetric flow of air flowing into the air chamber equals the volumetric flow of air flowing out of the air chamber.

The quantity of the air fed to the air chamber by way of the air inlet and the air outlet valve, in particular the air outlet valve disposed in the air outlet, here in particular the throttle valve, are mutually adapted in such a manner that the pressure in the air chamber, in the case of an only partially activated activation element, in particular when the activation element is situated in an intermediate position within the second position portion of the activation element, is so high that the material valve activation element is moved to an intermediate position between the non-activated terminal position and the completely activated terminal position, and is held in said intermediate position as long as there is no change in the quantity of air, i.e. the volumetric flow, flowing from the air inlet of the material valve activation device into the air chamber of the material valve activation device. There is an equilibrium between air flowing into the air chamber and air flowing out of the air chamber also in this intermediate position, i.e. the volumetric flow of air flowing into the air chamber equals the volumetric flow of air flowing out of the air chamber.

The material valve activation element is preferably designed as at least one piston which is movably disposed within a cylinder, or has such a piston.

The air outlet valve, in particular the throttle valve, in the simplest case is a constriction, in particular in the air outlet, in particular a throttle ahead of which air backs up and through which air flows in a throttled manner. The air outlet can have a throttle valve as well as a pressure relief valve. A plurality of air outlets having in each case at least one air outlet valve of identical or dissimilar type can also be provided.

The spray gun and/or the material valve particularly preferably have/has a material valve activation device, wherein the material valve activation device has at least one air inlet and one air outlet, wherein the material valve activation device is designed in such a manner that the air flowing from the air inlet activates a material valve activation element for activating, in particular for opening, the material valve, in particular exerts on the material valve activation element a force in a first direction, wherein the material valve activation element furthermore has at least one material valve resetting device, in particular at least one spring element, in particular at least one compression spring and/or at least one tension spring, which are/is designed in such a manner that said spring counteracts the activation of the material valve activation element by the air, in particular that said spring exerts on the material valve activation element a force in a second direction, different from the first direction, in particular in a second direction counter to the first direction.

The material valve activation device, the at least one air inlet, the at least one air outlet and/or the material valve activation element for activating, in particular for opening, the material valve can be designed as described above and possess the purposes and functional modes described above. In addition to the material valve activation device described above, the present material valve activation device has at least one material valve resetting device. The latter can in particular have at least one spring element, in particular at least one spring element, in particular a compression spring and/or at least one tension spring, or the material valve resetting device can be designed as a spring element, in particular as a compression spring and/or as a tension spring. The material valve resetting device is designed in such a manner that said material valve resetting device counteracts the activation of the material valve activation element by the air, in particular that said material valve resetting device exerts on the material valve activation element a force in a second direction, different from the first direction, in particular in a second direction counter to the first direction. As described above, the pressure in the air chamber increases the more air flows into the air chamber. The higher the pressure in the air chamber, the further the material valve activation element moves. The material valve resetting device preferably counters this pressure in the air chamber, which acts on the material valve activation element and moves the latter, in that said material valve resetting device applies a counterforce to the material valve activation element. In the case of a non-activated activation element, the ambient pressure substantially prevails in the air chamber of the material valve activation device, as described above. In this situation, the material valve resetting device preferably holds the material valve activation element in the non-activated terminal position of the latter. When the activation element is activated, in particular in a second position portion of the activation element described above, air flows from the air inlet of the material valve activation device into the air chamber of the material valve activation device, as a result of which the pressure in the air chamber rises. The material valve resetting device above a specific pressure is no longer able to hold the material valve activation element in the non-activated terminal position, whereupon the material valve activation element moves, in particular in the direction of the material valve resetting device. The material valve resetting device is particularly preferably designed in such a manner that the force which the material valve resetting device exerts on the material valve activation element is variable, in particular increases by way of a specific parameter. When the material valve resetting device is designed as a spring element, for example, in particular as a compression spring or as a tension spring, the force increases with the spring travel, i.e. the distance by which the spring is compressed. A material valve resetting device designed as a compression spring is expediently disposed on the side of the material valve activation element that faces away from the air chamber; a material valve resetting device designed as a tension spring is expediently disposed on the side of the material valve activation element that faces the air chamber.

The quantity of air supplied to the air chamber by way of the air inlet, the air outlet valve, in particular the air outlet valve disposed in the air outlet, here in particular the throttle valve, and the material valve resetting device are mutually adapted in such a manner that, in the case of a partially activated activation element, in particular when the activation element is situated in an intermediate position within the second position portion of the activation element, the pressure in the air chamber is so high that the material valve activation element is moved to an intermediate position between the non-activated terminal position and the completely activated terminal position and is held in said intermediate position as long as the quantity of air, i.e. the volumetric flow, which from the air inlet of the material valve activation device flows into the air chamber of the material valve activation device does not change. The force which as a result of the pressure in the air chamber is exerted on the material valve activation element is thus exactly the same as the force exerted in the opposite direction on the material valve activation element by the material valve resetting device. There is thus an equilibrium of forces between the pressure in the air chamber and the material valve resetting device. In this intermediate position of the trigger and material valve activation element there is also an equilibrium between air flowing into the air chamber and air flowing out of the air chamber, i.e. the volumetric flow of air flowing into the air chamber equals the volumetric flow of air flowing out of the air chamber.

The spray gun, the material valve activation device, the air outlet of the material valve activation device and/or the air outlet valve of the air outlet are generally designed in such a manner that there is at a specific pressure an equilibrium between air flowing into the air chamber and air flowing out of the air chamber, i.e. between the volumetric flow of air flowing into the air chamber and the volumetric flow of air flowing out of the air chamber. The more intensely the activation element is activated and the more air flows into the air chamber as a result, the higher the pressure at which this equilibrium is achieved.

When the activation element is partially released upon activation, less air flows into the air chamber by way of the air inlet, and the pressure at which the equilibrium mentioned above is achieved drops, wherein partially released presently is to be understood to mean in general that the activation element is moved to a less intensely activated position, or to a less intensely activated status, respectively. In this way, the force acting on the material valve activation element by the pressure in the air chamber also drops. As a result, the material valve resetting device which exerts a force in the opposite direction on the material valve activation element is able to move the material valve activation element somewhat further in the direction of the air chamber again; in particular, a material valve resetting device designed as a spring element can somewhat relax, in particular rebound, and thus move the material valve activation element somewhat further in the direction of the air chamber again. This causes the material valve to close somewhat again. If the material valve activation element is disposed on a material needle, this typically means that the material needle moves somewhat in the direction of the material outlet opening of the material nozzle again.

When the activation element upon activation is completely released, air no longer flows into the air chamber by way of the air inlet, wherein completely released presently is to be understood to mean in general that the activation element is moved to the non-activated position, or to the non-activated status, respectively. The material valve resetting device is now able to push the material valve activation element into the non-activated terminal position of the latter. The air situated in the air chamber is partially forced out of the air outlet such that the ambient pressure substantially prevails in the air chamber again.

The spray gun can in particular be designed in such a manner that air flows through an opened air valve, in particular from a valve inlet region into a valve outlet region, in particular that air flows through the first air valve mentioned above, in particular from the first valve inlet region mentioned above into the first valve outlet region mentioned above and/or to a, in particular the, material valve activation device mentioned above and/or to a, in particular the, material valve activation element described above, only when the activation element is imparted a change of status, in particular a change of position, in particular when the activation element is more intensely activated. This is advantageous in particular in the case described above, in which the spray gun according to the invention has at least one first air valve and at least one second air valve, in particular a second air valve disposed upstream of the first air valve, having at least one second valve outlet region, in particular at least one second valve outlet region which is disposed between the first air valve and the second air valve. The air of the first valve outlet region is preferably used for activating the material valve, said air being in particular fed to a material valve activation element. The air of the second valve outlet region is preferably fed to at least one air outlet opening of the spray gun, in particular at least one atomization air outlet opening and/or at least one forming-air outlet opening and/or at least one transport-air outlet opening. The second valve outlet region can preferably direct a significantly larger quantity of air than the first air outlet region. The air follows the path of least resistance, i.e. when the first air valve and the second air valve are opened, said air flows into the first valve outlet region only until a specific air pressure is achieved in the first valve outlet region and/or in an air chamber connected to the first valve outlet region, in particular the air chamber which is described above and has the material valve activation element. Once this pressure is achieved, the air continues to flow only through the second valve outlet region. The air in the first valve outlet region, or in the air chamber connected thereto, respectively, is stationary, so to speak, and the constant air pressure prevailing therein pushes onto the material valve activation element by way of a constant force. A material valve resetting device, in particular the material valve resetting device described above, exerts a counterforce on the material valve activation element such that the material valve activation element remains positionally stable. The material valve and/or a closure part of the material valve remain/remains in a specific position, a specific orientation and/or in a specific status, in particular activation status, in particular degree of activation. It is only when the activation element is activated further, i.e. more intensely, again, thus the first air valve is further opened, in particular the flow cross section is increased, that air flows through the first air valve into the first valve outlet region again, as a result of which the pressure in the first valve outlet region, or in the air chamber connected thereto, respectively, increases, as a result of which a greater force acts on the material valve activation element. The material valve activation element moves, the material valve is in particular more intensely activated, in particular further opened. However, a status in which a specific air pressure prevails in the first valve outlet region and/or in an air chamber connected to the first valve outlet region, in particular the air chamber which is described above and has the material valve activation element, is very rapidly achieved again, said specific air pressure causing the air to continue to flow only through the second valve outlet region.

When the activation element upon activation is partially released, a lower pressure than prior to the partial release bears on the first valve outlet region and on the activation element, wherein partially released here also is to be understood to mean in general that the activation element is moved to a less intensely activated position, or to a less intensely activated status, respectively. In this way, the force acting on the material valve activation element by the pressure also drops. As a result, the material valve resetting device which exerts a force in the opposite direction on the material valve activation element is able to move the material valve activation element somewhat further in the direction of the air chamber again; in particular, a material valve resetting device designed as a spring element can relax somewhat, in particular rebound, and thus move the material valve activation element somewhat further in the direction of the air chamber again. This causes the material valve to close somewhat again. If the material valve activation element is disposed on a material needle, this typically means that the material needle moves somewhat in the direction of the material outlet opening of the material nozzle again.

When the activation element upon activation is completely released, there is no longer any pressure bearing on the first valve outlet region and on the activation element, wherein completely released presently is to be understood to mean in general that the activation element is moved to the non-activated position, or to the non-activated status, respectively. The material valve resetting device is now able to push the material valve activation element to the non-activated terminal position of the latter. The air situated in the air chamber is partially forced out of the air outlet such that the ambient pressure substantially prevails in the air chamber again.

The spray gun is preferably designed in such a manner that said spray gun functions by means of a mixture of both functional modes described above, i.e. based on an equilibrium between air flowing into the air chamber and air flowing out of the air chamber, as well as based on the path of least resistance.

The second air valve during the entire activation path of the first air valve is preferably opened so wide that the maximum possible quantity of air can flow through the second air valve at all times. This means that the volumetric flow flowing through the second air valve during the entire activation path of the first air valve is not restricted by the second air valve but potentially by the above-mentioned air outlet openings of the spray gun to which the air from the second air valve, or the second valve outlet region is fed, respectively. It is prevented as a result that pressure variations arise in the region of the second air valve and thus pressure variations arise in the atomization air, the forming air and/or the transport air when the activation status, in particular the degree of activation of the activation element is changed, in particular when the degree of activation of the activation element is increased and air flows toward the activation element which are caused as a result are increased.

The material valve resetting device in all functional modes of the spray gun according to the invention, i.e. in the functional mode based on an equilibrium between air flowing into the air chamber and air flowing out of the air chamber, as well as in the functional mode based on the path of least resistance, and also in the case of a mixture of both functional modes, can thus in particular be designed for resetting the material valve from a second terminal position in which the material valve is completely opened to a first terminal position in which the material valve is closed, and/or for resetting the material valve from at least one intermediate position in which the material valve is partially opened to a first terminal position in which the material valve is closed, and/or for holding the material valve in a first terminal position in which the material valve is closed.

In the spray gun according to the invention, the first air valve, the material valve resetting device and the air outlet disposed downstream of the activation element have to be mutually adapted in particular.

It is generally preferable for the spray gun according to the invention to be designed in such a manner that a material valve of the spray gun according to the invention is opened pneumatically, i.e. by air, and is closed mechanically, in particular by a spring force. The material valve is preferably held in an activation status as a result of the interaction of a pneumatically generated force and a mechanically generated force.

It is possible in particular as a result of the design embodiments described above that the position of the material valve at least in one position portion of the activation element continually changes as a function of the variation of the position of the activation element, specifically in both activation directions of the activation element, i.e. when activating as well as when partially and/or completely releasing.

The spray gun according to the invention is particularly preferably designed in such a manner that the air flowing from at least one valve outlet region and used for activating the material valve, in particular the air flowing out of an air outlet of a material valve activation device, is fed to at least one air outlet opening of the spray gun, in particular at least one atomization air outlet opening and/or at least one forming-air outlet opening and/or at least one transport air outlet opening. The air outlet of a material valve activation device is particularly preferably the air outlet of the material valve activation device described above. The air flowing from the air outlet is fed to at least one air outlet opening of the spray gun and is thus not lost but able to be used in an expedient manner. In particular, the air can be fed to at least one atomization air outlet opening and/or at least one forming-air outlet opening and/or at least one transport air outlet opening, as have been described above.

The spray gun according to the invention preferably has at least one activation element resetting device, in particular at least one spring element, in particular at least one compression spring and/or at least one tension spring. The activation element resetting device is preferably designed in such a manner that said activation element resetting device holds an activation element in a non-activated terminal position and, when releasing the activation element upon activation, moves the activation element back to the non-activated terminal position thereof. The force generated by the activation element resetting device can be relatively minor so that the user of the spray gun has to activate the activation element counter to only a relatively minor restoring force.

As has already been indicated above, the spray gun is preferably designed in such a manner that resetting of the material valve by means of the material valve resetting device takes place in that air can escape from an air chamber by way of the air outlet, while decreasing the air pressure in the air chamber.

An air inlet disposed upstream of the activation element, in particular the above-mentioned air inlet to an air chamber, and/or an air outlet disposed downstream of the activation element, in particular the above-mentioned air outlet from an air chamber, can in each case have a fixed and/or a variable valve; in particular, the air inlet and/or the air outlet can in each case have a feedback-controlled valve.

The spray gun according to the invention particularly preferably has at least one main body, at least one air nozzle having at least one air outlet opening, in particular at least one atomization air outlet opening for exhausting air for atomizing a material to be sprayed, at least one forming-air outlet opening for exhausting air for changing the shape of a spray jet, and/or at least one transport-air outlet opening for exhausting air for transporting an atomized spray medium, at least one activation element, in particular a trigger, at least one air valve, in particular at least one air valve coupled to the activation element, in particular an air valve which is in particular spring-mounted and by way of a valve piston is coupled to the activation element, in particular to the trigger, at least one spray gun air inlet, at least one material needle, and at least one material nozzle having at least one material outlet opening, wherein the spray gun is designed in such a manner that, when activating the activation element to a first degree of activation, the air valve opens so that air, in particular compressed air, from the spray gun air inlet of the spray gun, in particular by way of a clearance in the valve piston, by way of a first valve outlet region flows into a material valve activation device, in particular into a material valve activation device having at least one material valve activation cylinder and at least one material valve activation element which is movably disposed within the material valve activation cylinder and designed as a piston, wherein the quantity of air flowing into the material valve activation device increases as the degree of activation of the activation element increases, wherein the air flowing into the material valve activation device exerts on the material needle disposed in the material valve activation device and/or on a part disposed on the material needle, in particular on the material valve activation element designed as a piston, a force in a direction facing away from the material nozzle, wherein the force exerted on the material needle and/or on the part disposed on the material needle increases as the degree of activation of the activation element increases, as a result of which the material needle is moved over a second distance in a direction facing away from the material nozzle, and as a result is moved out of the material outlet opening of the material nozzle by this second distance, wherein the second distance is a function of a first distance by which the activation element when activated is activated from the first degree of activation, and wherein the air, at least upon reaching a maximum pressure within the material valve activation device, flows from the material valve activation device, in particular from the material valve activation device to the air nozzle, in particular from the material valve activation device to at least one air outlet opening in the air nozzle. The explanations above can apply in an analogous manner here.

The spray gun according to the invention can have at least one continual valve which can be designed in particular as a proportional valve, a feedback-controlled valve and/or as a servo valve. In general, the volumetric flow of air should be able to be adjusted by means of at least one valve. In particular, an air valve mentioned above, in particular the first air valve and/or the second air valve, can be designed in such a manner.

The spray gun according to the invention can have at least one activation region and at least one trigger region, in particular at least one trigger region which is able to be separated from the at least one activation region, wherein the at least one activation region has at least one activation element, and/or the at least one trigger region has at least one material valve, in particular for discharging material to be sprayed, wherein the at least one activation region and the at least one trigger region are connected to one another and/or able to be connected to one another by means of a connection element designed as, for example, an air duct, a hose and/or as a tube. The cleaning of the spray gun can be facilitated as a result, for example.

The spray gun according to the invention can comprise at least one device which by way of mechanical means assists or initiates, respectively, a breakaway, in particular a breakaway of the material needle, in particular from the non-activated position of the latter, i.e. when the material outlet opening of the material nozzle, or of the material valve, respectively, is closed by the material needle. This can be advantageous, for example, when remnants of a sprayed material remain and dry in the material outlet opening after the use of the spray gun. As a result, the material needle can adhesively bond in the material outlet opening. A relatively great force is required in order for said adhesive bond to be released, said force possibly not being able to be applied by the pneumatic means described above. The functional reliability of the spray gun according to the invention can be enhanced by slightly "tapping" the material needle by at least one mechanical device in order for the material needle to break away from the non-activated position thereof. Nevertheless, the at least one material valve can be considered to be able to be pneumatically activated, in particular opened, in particular able to be activated, in particular opened, exclusively pneumatically, because only the initial tapping of the material needle that is mentioned is performed mechanically but the further activation is performed pneumatically.

It can be provided that the breakaway of the material needle always takes place mechanically, or by mechanical means, respectively, in particular by the at least one mechanical device for breaking away the material needle, in particular from the non-activated position of the latter. Alternatively however, it can also be provided that this is the case only when the pneumatic means described above cannot apply the force necessary for the breakaway. In this way it can be provided, for example, that the activation element, in particular the trigger, or part thereof, engages on a follower on the paint needle when the activation element has reached a specific degree of activation, without the material needle having been moved out of the material outlet opening. If the pneumatic means described above have been able to apply the force required for breaking away the material needle from the non-activated position of the latter, and if the material needle has moved out of the material outlet opening, the mechanical device is thus not involved, the activation element or part thereof in particular not engaging on a follower on the paint needle. This functional mode is able to be achieved in particular by correspondingly positioning the follower in the axial direction on the material needle.

Of course, the mechanical device described above, or at least one further mechanical device for breaking away in particular the material needle, can also assist or initiate a breakaway of the material needle from the completely activated position of the latter, i.e. when the material needle has moved completely out of the material outlet opening of the material nozzle, or of the material valve, respectively. This can be advantageous in the case where the paint needle has become stuck in the completely activated position thereof, in particular in the rear terminal position thereof.

The mechanical device described above, or at least one further mechanical device for breaking away in particular the material needle, can also assist or initiate a breakaway of the material needle from the partially activated position of the latter, i.e. when the material needle has moved partially out of the material outlet opening of the material nozzle, or of the material valve, respectively. This can be advantageous in the case where the paint needle has become stuck during the movement thereof from the front to the rear terminal position or vice versa.

BRIEF DESCRIPTION OF THE DRAWINGS

The invention will be explained in more detail by way of example hereunder by means of four figures in which.

DETAILED DESCRIPTION

Figure 1:
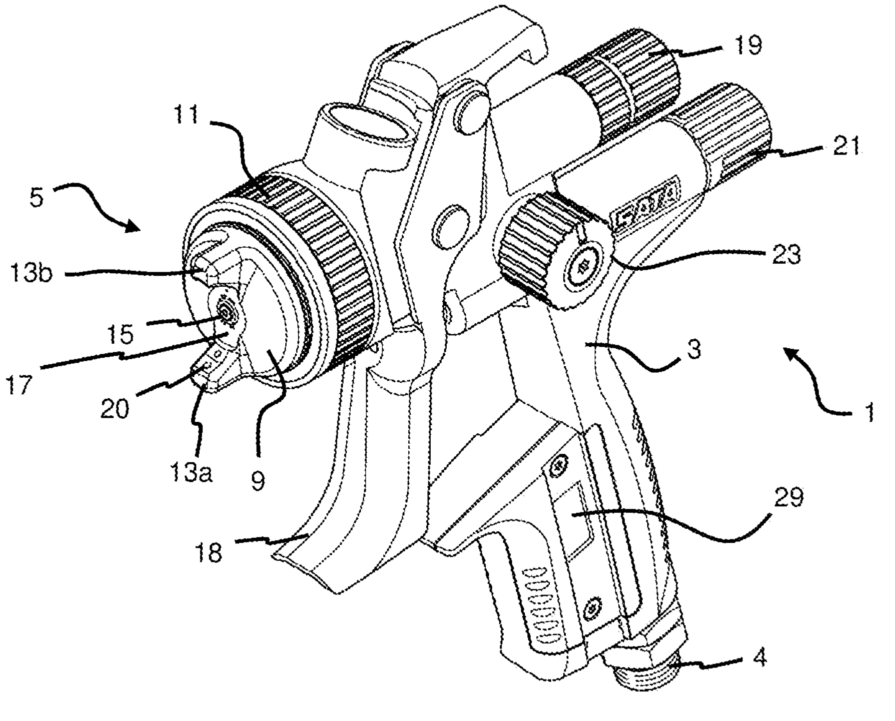
FIG. 1 shows a perspective view of an exemplary embodiment of a spray gun according to the invention.

FIG. 1 shows a perspective view of an exemplary embodiment of a spray gun 1 according to the invention, having a main body 3, a spray gun air inlet 4 being disposed on the lower end of said main body 3. The spray gun 1 furthermore has an air nozzle 5 which presently comprises an air cap 9 which by means of an air nozzle ring 11 is screwed to the main body 3 of the spray gun 1. The air cap 9 in the exemplary embodiment shown has two horns 13*a*, 13*b* having in each case two forming-air outlet openings 20. Moreover, said air cap 9 possesses a central opening which presently, conjointly with a material nozzle that is screwed into the main body 3, forms an atomization air outlet opening 15 designed as an annular gap. A plurality of transport-air outlet openings 17, which can also be referred to as control openings and can act as such, are in each case incorporated on two mutually opposite sides of the atomization air outlet opening 15, so as to be next to the atomization air outlet opening 15. A material quantity control which is able to be activated by way of a material quantity rotary control button 19 is disposed in the spray gun 1. A rear detent for a paint needle is able to be defined by way of the material quantity control, i.e. it can be adjusted by way of the material quantity control how far the paint needle can exit the material outlet opening of the material nozzle when the activation element 18, presently designed as a trigger, is completely activated. As a result, the maximum flow cross section for the material flowing out of the material outlet opening of the material nozzle, and thus the quantity of the material sprayed by the spray gun 1, is defined.

The spray gun 1 moreover has a device by way of which the quantity of air which from an air inlet duct assembly which is not visible in FIG. 1 and from the spray gun air inlet 4 extends upward through the handle of the spray gun 1 flows into an upper part of the gun body 3 is able to be adjusted. To this end, a so-called air micrometer can be used, which presently is able to be activated by means of an air micrometer rotary button 21. The air micrometer can be designed as a sleeve, for example, which in the wall thereof has an opening, the degree of overlap of said opening with the port of the air inlet duct assembly being able to be adjusted. The flow cross section through which the air from the handle region of the spray gun 1 can flow into an upper part of the gun body 3 is able to be adjusted in this way.

The present exemplary embodiment of a spray gun 1 according to the invention in the interior thereof has a first air outlet duct assembly, not visible in FIG. 1, and a second air outlet duct assembly, likewise not visible in FIG. 1. The first air outlet duct assembly can in particular be an air outlet duct assembly for directing air for the atomization of a material to be sprayed. This air outlet duct assembly can be referred to as an atomization air duct assembly or as an atomization air duct. The air directed by said duct assembly or duct can flow out of the atomization air outlet opening 15, which is formed by the central opening and by the material nozzle screwed into the main body 3 and is configured as an annular gap, and said air can be referred to as atomization air. The second air outlet duct assembly can in particular be an air outlet duct assembly for directing air for changing the shape of a spray jet. This air outlet duct assembly can be referred to as a forming-air duct assembly or as a forming-air duct. The air directed by said duct assembly or duct can flow out of the forming-air outlet openings 20 of the horns 13*a*, 13*b* and be referred to as forming air. Visible in FIG. 1 is a round-broad jet rotary button 23 for activating a control device for distributing between the atomization air duct assembly and the forming-air duct assembly the air flowing out of the air inlet duct assembly.

The spray gun 1 moreover has a device for entering and/or adjusting and/or detecting and/or determining and/or displaying the air pressure prevalent in an air chamber during the operation of the spray gun 1, said device having a display 29. In the present exemplary embodiment, this is a device for determining and displaying the air pressure prevalent in an air chamber during the operation of the spray gun, said device furthermore having a device for detecting an air pressure, in particular a pressure sensor.

Figure 2:
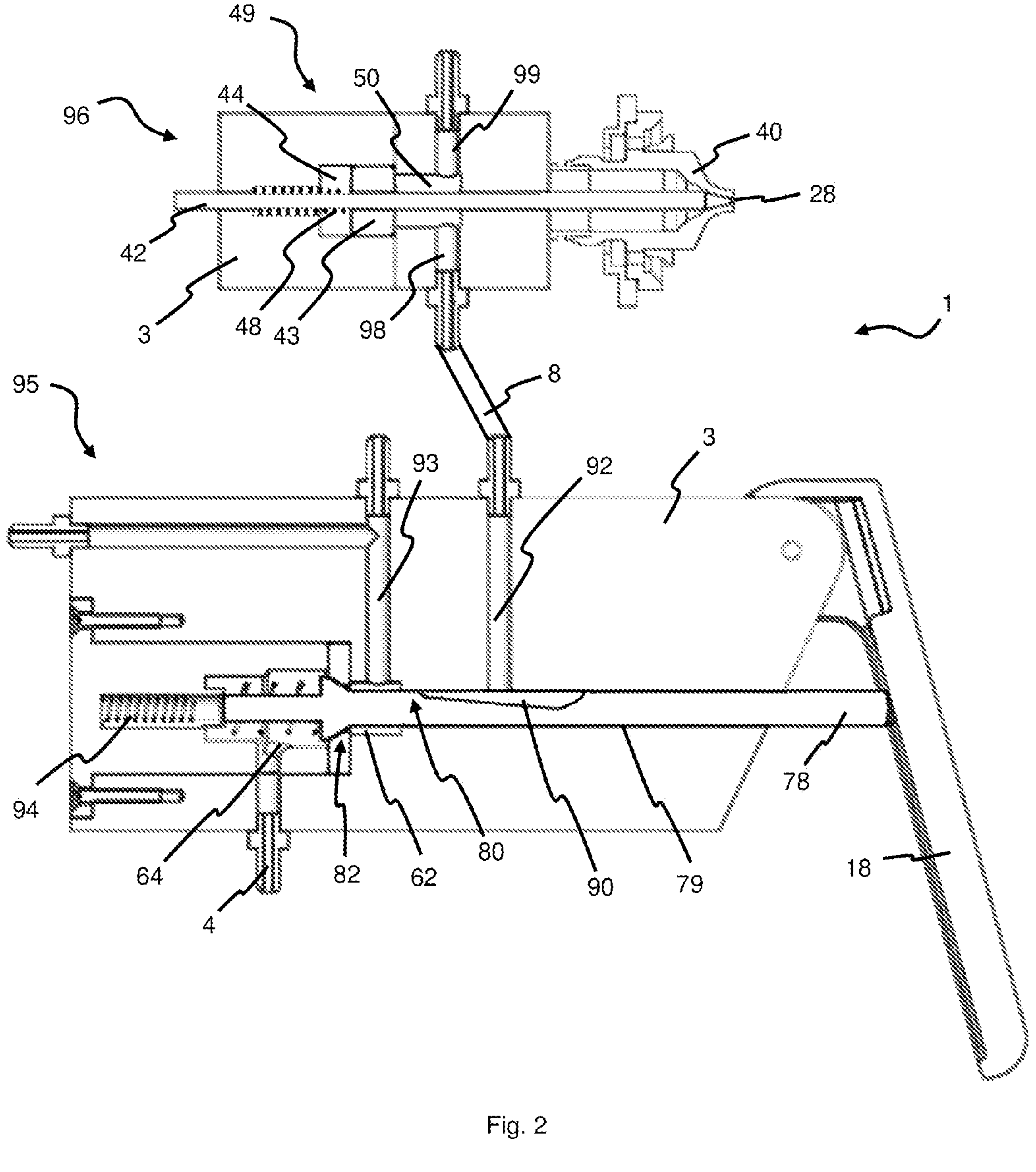
FIG. 2 shows an illustration of the schematic functional principle of an exemplary embodiment of a spray gun according to the invention, having a non-activated activation element.
Figure 3:
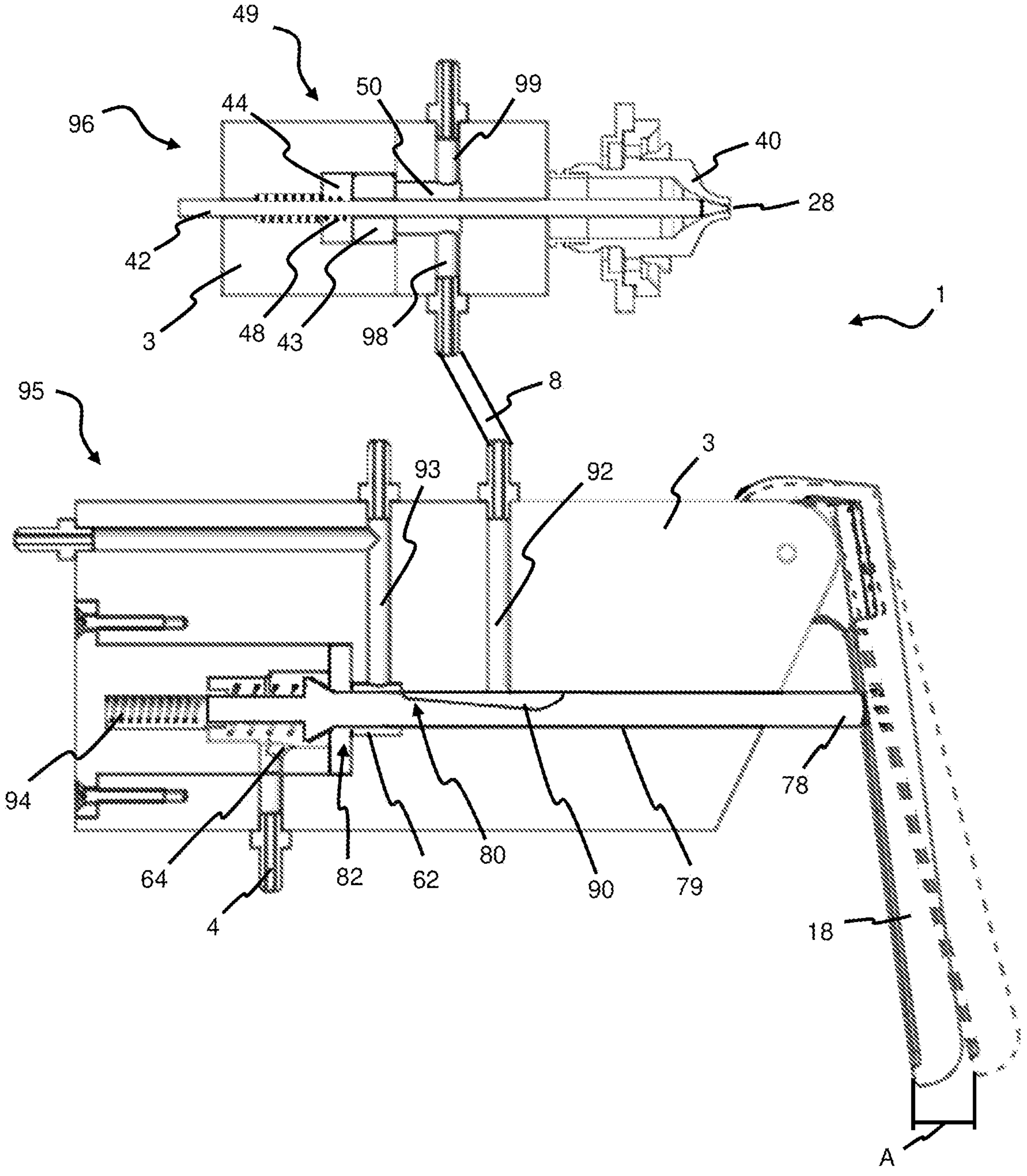
FIG. 3 shows an illustration of the schematic functional principle of an exemplary embodiment of a spray gun according to the invention, having a partially activated activation element.
Figure 4:
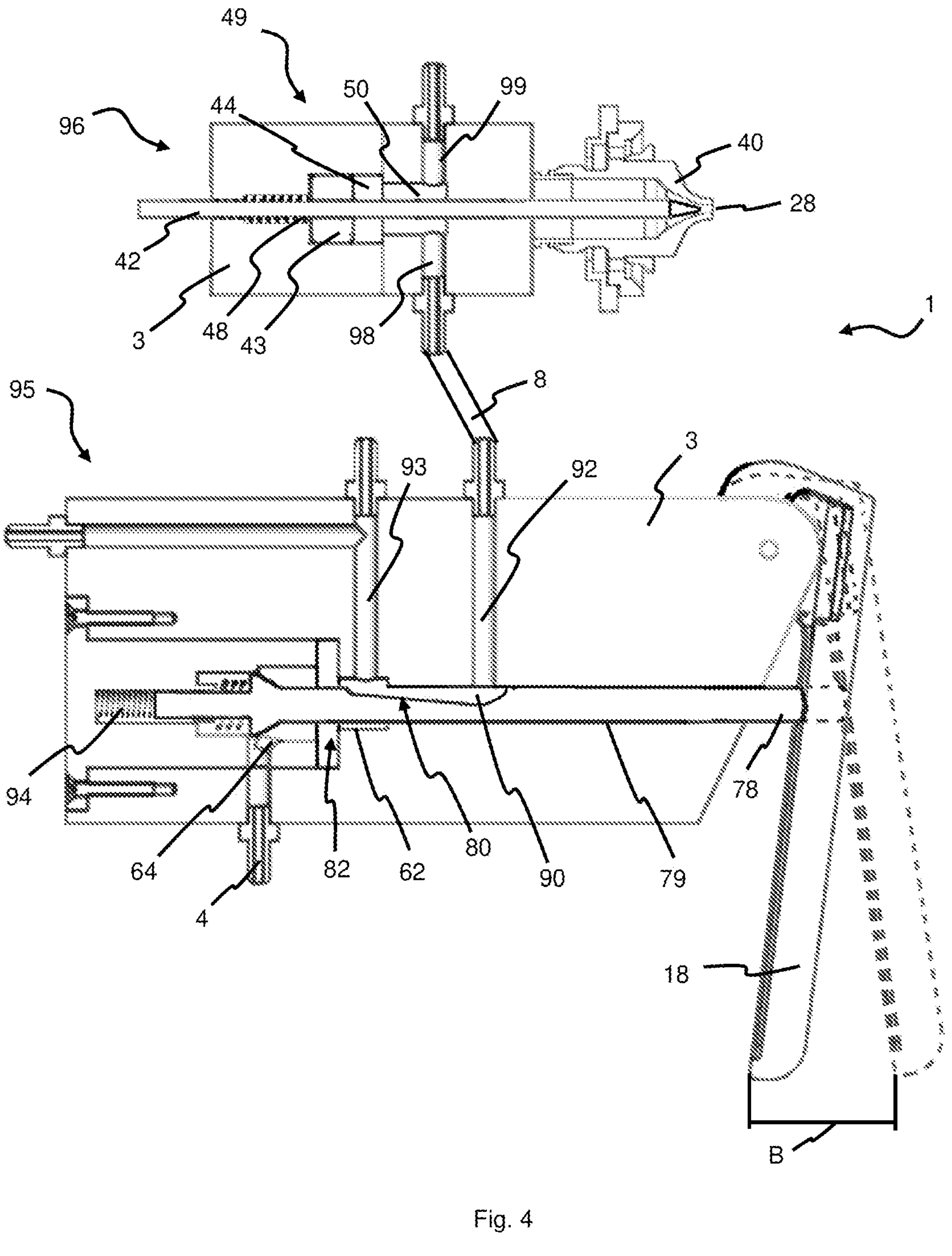
FIG. 4 shows an illustration of the schematic functional principle of an exemplary embodiment of a spray gun according to the invention, having a completely activated activation element.

FIG. 2, FIG. 3 and FIG. 4 show in each case an illustration of the schematic functional principle of an exemplary embodiment of a spray gun 1 according to the invention.

The spray gun 1 has in each case an activation element 18 which is designed as a trigger, by way of which a valve piston 78 is able to be activated, i.e. said valve piston 78 presently being mounted so as to be movable in the axial direction in a valve piston receptacle duct 79 in the main body 3 of the spray gun 1. The valve piston receptacle duct 79 has approximately the same diameter as the valve piston 78, and the valve piston 78 is disposed in a sealing manner in the valve piston receptacle duct 79. The valve piston 78 presently has a clearance 90 which in the exemplary embodiment shown is enlarged, in particular depressed, in the direction of the activation element 18. A region of the valve piston 78 which does not have any clearance and preferably bears in a sealing manner on the wall of the valve piston receptacle duct 79 is situated so as to be adjacent to the clearance 90 in the valve piston 78. This region of the valve piston 78, conjointly with the wall of the valve piston receptacle duct 79, which is part of the main body 3 of the spray gun 1, forms a first air valve 80. A short duct portion having a somewhat larger diameter than the diameter of the valve piston receptacle duct 79 is situated upstream of the valve piston receptacle duct 79. This duct portion can be designed as at least part of a first valve inlet region 62. An upstream edge of the first valve inlet region 62 can be designed as a valve seat for the closure part, in particular the air valve head, of a second air valve 82.

In order to improve the tightness between the valve piston 78 and the wall of the valve piston receptacle duct 79, in particular of the main body 3 of the spray gun 1, sealing elements can be disposed between the valve piston 78 and the wall of the valve piston receptacle duct 79, in particular directly upstream of the clearance 90 in the valve piston 78 and in a region of the valve piston 78 that faces away from this sealing element.

FIG. 2, FIG. 3 and FIG. 4 furthermore show in each case a material valve 96 having a material nozzle 40. The material nozzle 40, or the material valve 96, respectively, has a material outlet opening 28 and a material needle 42. A material valve activation element 43, presently designed as a piston, for activating, in particular for opening and/or closing, the material valve 96 is fixedly disposed on the material needle 42, in particular so as to be immovable in the axial direction. The material valve activation element 43 is mounted so as to be movable in the axial direction in a material valve activation cylinder 44. A material valve resetting device 48 designed as a compression spring bears on the side of the material valve activation element 43 that faces away from the material nozzle 40. An air chamber 50 which is supplied with air by way of an air inlet 98 is situated on the side of the material valve activation element 43 that faces away from the material valve resetting device 48. The material valve 96, or the air chamber 50, respectively, furthermore has an air outlet 99 from which air can flow out of the air chamber 50. The assembly composed of the material valve activation element 43, the material valve resetting device 48, the air chamber 50, the air inlet 98 and the air outlet 99 can be designed as a material valve activation device 49 which is preferably disposed within the main body 3 of the spray gun 1 but may also be disposed outside the latter.

The air inlet 98 is connected to a first valve outlet region 92, presently by way of a connection element 8. However, the first valve outlet region 92 and the air inlet 98 can also be directly adjacent to one another, and/or be designed as a common duct.

The present exemplary embodiment of a spray gun 1 according to the invention furthermore has a second valve outlet region 93 and a spray gun air inlet 4. The second valve outlet region 93 and the first valve inlet region 62 at least in regions are presently designed as a common duct. Furthermore, the spray gun 1 according to the invention can have an activation element resetting device 94 which can in particular be designed as one or a plurality of compression springs and which returns the activation element 18, when released, to the non-activated terminal position thereof and/or holds said activation element 18 in the latter.

A schematic functional principle of an exemplary embodiment of a spray gun 1 according to the invention, having a non-activated activation element 18 is shown in FIG. 2, i.e. the activation element 18 is situated in a first terminal position. The first air valve 80 as well as the second air valve 82 are closed. This means that air, in particular compressed air, which flows into the spray gun air inlet 4 of the spray gun 1, cannot flow out of the valve inlet region, in particular from the second valve inlet region 64 of the second air valve 82, by way of the second air valve 82, and thus can also not flow to the first air valve 80. The material valve 96 is non-activated, i.e. the material outlet opening 28 of the material nozzle 40, or of the material valve 96, respectively, is presently closed by the material needle 42. A medium to be sprayed, which is fed to the material nozzle 40 by way of a material infeed presently not shown, cannot exit the material outlet opening 28. In this status shown in FIG. 2, air also does not flow out of the air outlet openings of the air nozzle 5 of the spray gun 1 shown in FIG. 1.

In contrast, a schematic functional principle of an exemplary embodiment of a spray gun 1 according to the invention, having a partially activated activation element 18, is shown in FIG. 3. The activation element, illustrated by dashed lines, represents the position of the activation element 18 in the non-activated position shown in FIG. 2. The first terminal position of the activation element 18, which is shown in FIG. 2 and in which the activation element 18 is non-activated, and the first intermediate position of the activation element 18 which is shown in FIG. 3 and in which the activation element 18 is partially activated, define, in particular delimit, a first position portion A of the activation element 18. When the activation element 18 is activated within this first position portion A, the second air valve 82 is thus opened, whereupon air from the spray gun air inlet 4 of the spray gun 1 can flow into the second valve inlet region 64 of the second air valve 82, through the second air valve 82 and out of the second valve outlet region 93. The air from the second valve outlet region 93 is preferably fed to air outlet openings in the air nozzle 5 of the spray gun 1 shown in FIG. 1, preferably to at least one atomization air outlet opening 15, but possibly also to transport-air outlet openings 17 and/or forming-air outlet openings 20. The air flowing out of the atomization air outlet opening 15 in particular serves as the preliminary air described above, before said preliminary air can fulfill the purpose thereof as atomization air once the material valve 96, or the material nozzle 40, respectively, has been activated, in particular opened and the material to be sprayed can exit the material outlet opening 28.

In the situation shown in FIG. 3, the first air valve 80 is still just closed so that no air from the first valve inlet region 62, which is simultaneously part of the second valve outlet region 93, as already mentioned, can flow through the first air valve 80 into the first valve outlet region 92. The material valve 96 continues to be non-activated, i.e. the material outlet opening 28 of the material nozzle 40, or of the material valve 96, respectively, presently is still closed by the material needle 42. A medium to be sprayed, which is fed to the material nozzle 40 by means of a material infeed presently not shown, can still not exit the material outlet opening 28.

FIG. 4 shows an illustration of the schematic functional principle of an exemplary embodiment of a spray gun 1 according to the invention, having a completely activated activation element 18. The activation element illustrated by dashed lines represents the position of the activation element 18 in the partially activated position shown in FIG. 3. The partially activated position of the activation element 18 which is shown in FIG. 3, and the terminal position of the activation element 18 which is shown in FIG. 4 and in which the activation element 18 is completely activated, define, in particular delimit, a second position portion B of the activation element 18. The second air valve 82 as well as the first air valve 80 are opened within this second position portion B of the activation element 18. Air flows through the spray gun air inlet 4 of the spray gun 1 and into the second valve inlet region 64 of the second air valve 82, and from there into the second valve outlet region 93 which is simultaneously part of the first valve inlet region 62, as has already been mentioned. The air is divided in this region. The significantly larger part of the air flows out of the second valve outlet region 93, while a smaller part of the air flows through the first air valve 80 into the first valve outlet region 92. From there, said air, presently by way of a connection element 8, flows into the air chamber 50 by way of the air inlet 98. The air outlet 99 of the air chamber preferably has a throttle, in particular a throttle valve. Therefore, the air, if at all, can escape from the air chamber only very slowly, which is why the pressure within the air chamber 50 increases. This pressure exerts a force on the material valve activation element 43, said force, counter to the force exerted by the material valve resetting device 48 on the material valve activation element 43, moving the material valve activation element 43 rearward in the direction facing away from the material nozzle 40. The material valve activation element 43 in FIG. 4 has reached the completely activated position thereof, i.e. said material valve activation element 43 bears on a rear detent. This detent, or another detent on which the material needle 42 per se impacts, in all embodiments can be adjustable, in particular by way of a material quantity control which can be activated by way of a material quantity rotary control button 19 shown in FIG. 1. Since the material valve activation element 43 is fixedly disposed on the material needle 42, in particular so as to be immovable in the axial direction, the material needle 42 conjointly with the material valve activation element 43 moves toward the rear and out of the material outlet opening 28. The activation element 18 in the situation shown in FIG. 4 is completely activated, the material valve activation element 43 is likewise completely activated, and the material valve 96, or the material nozzle 40, respectively, are completely opened. In this situation, the maximum possible quantity of material to be sprayed flows out of the material outlet opening 28, or the maximum possible quantity of material to be sprayed is suctioned out of the material outlet opening 28 by the atomization air, or by the negative pressure generated by the atomization air at the front end of the material nozzle 40, respectively.

The spray gun 1 according to the invention in all embodiments is preferably designed in such a manner that in otherwise identical conditions, in the situation shown in FIG. 3 in which the activation element 18 is partially activated, the same quantity of air from the spray gun air inlet 4 of the spray gun 1 flows into the second valve outlet region 93 as in the situation shown in FIG. 4 in which the activation element 18 is completely activated. This quantity of air, in particular this volumetric flow, does not change even when the activation element 18 is activated within the second position portion B of the activation element 18. As has already been described above, pressure variations which could have a negative influence on the painting result can be avoided in this way.

When the activation element 18 is moved from the position illustrated by dashed lines in FIG. 4, i.e. from the partially activated position in which the first air valve 80 is just not yet opened, to the position illustrated by solid lines in FIG. 4, i.e. to the completely activated position, the material valve activation element 43 thus moves from the terminal position shown in FIG. 3, the non-activated position, to the position shown in FIG. 4, the completely activated terminal position. In this second position portion B the material valve 96 is thus able to be pneumatically activated, in particular opened. In the present case, said material valve 96 is even able to be activated, in particular opened, exclusively pneumatically, i.e. air exclusively initiates the status change in the material valve 96 and/or in the closure part of the material valve 96, and not exclusively or additionally an activation element which is coupled to the material valve or a material valve activation element as in the prior art. In the prior art, the activation element, as already described above, in most instances engages on a follower disposed on a material needle, as a result of which the material needle is extracted from the material outlet opening of a material nozzle toward the rear, the material valve thus being mechanically activated. This is not the case here. The material valve 96 presently is able to be activated, in particular opened, by means of air from at least one valve outlet region, here the first valve outlet region 92, specifically exclusively by means of air from the first valve outlet region 92. There is no physical contact between the activation element 18 and the material valve 96.

The position of the activation element 18 determines the position, or the status, respectively, of the material valve 96 at least in the second position portion B.

The spray gun 1 according to the invention is designed in such a manner that the material valve 96 by means of the activation element 18, at least in a position portion of the activation element 18, presently in the second position portion B, is able to be adjusted in a preferably stepless manner, however potentially also in steps.

The position, or the status, respectively, of the material valve 96 at least in a position portion of the activation element 18, presently in the second position portion B, continually changes as a function of the variation of the position of the activation element 18, preferably so as to be substantially proportional to the position of the activation element 18, preferably in both activation directions, i.e. when activating as well as when releasing in the context described above.

When the activation element 18 is activated even somewhat further from the position illustrated by dashed lines in FIG. 4, i.e. from the partially activated position in which the first air valve 80 is just not yet opened, i.e. moved somewhat further in the direction of complete activation, the first air valve 80 is thus opened somewhat so that air from the spray gun air inlet 4 of the spray gun 1 flows through the first air valve 82 into the second valve inlet region 64. As already mentioned, the largest part of the air flows out of the second valve outlet region 93, wherein however a smaller part of the air flows through the slightly opened first air valve 80 into the first valve outlet region 92, and from there into the air chamber 50. Since the quantity of air flowing into the air chamber 50 is relatively minor, the pressure in the air chamber 50 increases only slightly, as a result of which the material valve activation element 43, counter to the force exerted by the material valve resetting device 48 on the material valve activation element 43, is moved only slightly rearward in the direction facing away from the material nozzle 40. The material needle 42 as a result is likewise moved only slightly out of the material outlet opening 28. The material valve 96 is only slightly activated, and a relatively small quantity of material to be sprayed can exit the material nozzle 40.

When the activation element 18 is held in the slightly activated position, a small quantity of air continues to flow through the first air valve 80 into the air chamber 50. In this situation however, the air outlet 99, or the throttle of the air outlet 99, respectively, enables that approximately the same amount of air can flow through the air outlet 99 out of the air chamber 50 as flows into the air chamber 50 through the first air valve 80 and the air inlet 98, so that the pressure in the air chamber 50 is constantly kept at the relatively low level. It is only when the activation element 18 is activated somewhat further, the first air valve 80 thus being opened somewhat further, that somewhat more air flows into the air chamber 50, as a result of which the pressure in the air chamber 50 rises and the material valve activation element 43 is pushed somewhat further to the rear, and the material needle 42 is moved somewhat further out of the material outlet opening 28, whereupon somewhat more material can exit the material outlet opening 28.

When the activation element 18 is moved from a slightly activated position within the second position portion B to a more slightly activated position within the second position portion B, the activation element 18 thus being slightly released, less air thus flows through the first air valve 80 and the air inlet 98 into the air chamber 50 again. The pressure in the air chamber 50 drops, and the material valve resetting device 48 pushes the material valve activation element 43 somewhat further in the direction of the material nozzle 40 again.

When the activation element 18 is completely released from a slightly activated position within the second position portion B, the first air valve 80 first closes before the second air valve 82, whereupon air no longer flows through the first air valve 80 into the air chamber 50. The material valve resetting device 48 and the material valve activation element 43 force the remaining air in the chamber 50 out of the air outlet 99 of the air chamber 50 until approximately the ambient pressure prevails in the air chamber 50 again and the material valve 96 is non-activated.

The region below the connection element 8 can be considered as an activation region 95 and/or be designed as such. The activation region 95 can be able to be separated from a trigger region, the latter here being considered the material valve 96 or potentially having the material valve 96.

In general, the individual components mentioned in the exemplary embodiments can be used in all exemplary embodiments. The explanations pertaining to the exemplary embodiments can also apply to all exemplary embodiments.

The exemplary embodiments described describe only a limited selection of potential embodiments and thus do not represent any limitation of the present invention.

The invention claimed is:

1. A spray gun comprising:

at least one first air valve activatable by at least one activation element and including at least one first valve inlet region and at least one first valve outlet region; and at least one material valve for material to be sprayed, the at least one material valve being designed such that the at least one material valve is able to be pneumatically activated by air from the at least one first valve outlet region, wherein the spray gun is designed such that the at least one material valve can assume at least one first terminal position in which the at least one material valve is closed, one second terminal position in which the at least one material valve is completely opened, and at least one intermediate position in which the at least one material valve is partially opened, wherein the spray gun is designed such that the at least one activation element can assume at least one first terminal position in which the at least one activation element is non-activated, one second terminal position in which the at least one activation element is completely activated, and at least one intermediate position in which the at least one activation element is partially activated, wherein the position of the at least one activation element determines the position of the at least one material valve, wherein the spray gun further comprises a material valve activation device that includes at least one air inlet, one air outlet, and an intervening air chamber, wherein the air chamber on at least one side is delimited by at least one material valve activation element for activating the at least one material valve, wherein the spray gun is designed such that the pressure in the air chamber is determined at least by the quantity of air supplied via the air inlet to the air chamber and by at least one air outlet valve arranged in the air outlet, and wherein the air outlet valve and the quantity of the air supplied via the air inlet are designed such that, when the at least one activation element is held in the at least one intermediate position in which the at least one activation element is partially activated, the pressure in the air chamber holds the at least one material valve activation element in an intermediate position, which holds the at least one material valve in the at least one intermediate position in which the at least one material valve is partially opened.

2. The spray gun of claim 1, wherein the spray gun is designed such that the position in which the at least one material valve is held is adjustable in a stepless manner via the position in which the at least one activation element is held.

3. The spray gun of claim 1, wherein the spray gun is designed such that the position in which the at least one material valve is held continually changes as a function of the variation of the position of the at least one activation element.

4. The spray gun of claim 1, wherein the at least one material valve includes at least one material needle and one material outlet opening which is able to be closed by the at least one material needle, wherein the spray gun is designed such that by activating the at least one activation element the at least one material needle is able to be moved out of the material outlet opening, wherein activating the at least one activation element over a first distance generates a movement of the at least one material needle over a second distance, and wherein the second distance is a function of the first distance.

5. The spray gun of claim 1, wherein the at least one material valve includes at least one material needle and one material outlet opening which is able to be closed by the at least one material needle, wherein the at least one material valve activation element comprises a piston and is disposed on the at least one material needle, wherein the piston is movably disposed within a material valve activation cylinder, and wherein the piston is designed such that the piston is able to be activated by air from the at least one first valve outlet region.

6. The spray gun of claim 1, wherein the spray gun further comprises at least one second air valve including at least one second valve inlet region and at least one second valve outlet region, and wherein the at least one second air valve is able to be activated by the at least one activation element.

7. The spray gun of claim 1, wherein the spray gun further comprises at least one second air valve which is disposed upstream of the at least one first air valve and has at least one second valve outlet region which is disposed between the at least one first air valve and the at least one second air valve, and wherein the at least one second valve outlet region opens into at least one air outlet opening of the spray gun.

8. The spray gun of claim 1, wherein the spray gun is designed such that, when activating the at least one activation element within a first position portion of the at least one activation element, the at least one first air valve between at least one first valve inlet region and at least one first valve outlet region is closed, and at least one second air valve between at least one second valve inlet region and at least one second valve outlet region is opened, and wherein, when activating the at least one activation element within a second position portion of the at least one activation element, the at least one first air valve between the at least one first valve inlet region and the at least one first valve outlet region is opened and the second air valve between the at least one second valve inlet region and the at least one second valve outlet region is opened.

9. The spray gun of claim 1, wherein the at least one first air valve is integrated in a second air valve.

10. The spray gun of claim 1, wherein the at least one first air valve is formed by at least part of the main body of the spray gun and by a valve piston which has at least one clearance that is enlarged in the direction of the at least one activation element of the spray gun, wherein the valve piston is disposed between the at least one activation element and a closure part of a second air valve, and wherein the second air valve is formed by at least part of the main body of the spray gun and by the closure part.

11. The spray gun of claim 1, wherein the material valve activation device is designed such that the air flowing from the air inlet activates the material valve activation element by exerting on the material valve activation element a force in a first direction, and wherein the material valve activation element includes at least one material valve resetting device which is designed such that the at least one material valve resetting device counteracts the activation of the material valve activation element by exerting on the material valve activation element a force in a second direction, which is different from the first direction.

12. The spray gun of claim 1, wherein the spray gun is designed such that the air flowing from the at least one first valve outlet region and used for activating the at least one material valve is fed to at least one air outlet opening of the spray gun.

13. The spray gun of claim 11, wherein the spray gun is designed such that resetting of the at least one material valve by the material valve resetting device takes place by air from the air chamber escaping by way of the air outlet.

14. The spray gun of claim 1, wherein the spray gun further comprises:

at least one main body;

at least one air nozzle including at least one air outlet opening for exhausting air for atomizing a material to be sprayed, at least one forming-air outlet opening for exhausting air for changing the shape of a spray jet, and/or at least one transport-air outlet opening for exhausting air for transporting an atomized spray medium;

the at least one activation element, the at least one first air valve being coupled to the at least one activation element by way of a valve piston;

at least one spray gun air inlet;

at least one material needle; and at least one material nozzle having including at least one material outlet opening, wherein the spray gun is designed such that, when activating the at least one activation element to a first degree of activation, the at least one first air valve opens so that compressed air from the at least one spray gun air inlet of the spray gun by way of at least one second valve outlet region flows to the at least one air nozzle and flows from the at least one air outlet opening of the at least one air nozzle, wherein when activating the at least one activation element beyond the first degree of activation, compressed air from the at least one spray gun air inlet by way of a clearance in the valve piston, by way of the at least one first valve outlet region additionally flows into the material valve activation device which has at least one material valve activation cylinder, and the at least one material valve activation element comprises a piston that is movably disposed within the at least one material valve activation cylinder, wherein the quantity of air flowing into the material valve activation device increases as the degree of activation of the at least one activation element increases, wherein the air flowing into the material valve activation device exerts on the at least one material needle disposed in the material valve activation device and/or on a part disposed on the at least one material needle a force in a direction facing away from the at least one material nozzle, wherein the force exerted on the at least one material needle and/or on the part disposed on the at least one material needle increases as the degree of activation of the at least one activation element increases, as a result of which the at least one material needle in a direction facing away from the at least one material nozzle is moved over a second distance, and as a result is moved out of the at least one material outlet opening of the at least one material nozzle by the second distance, wherein the second distance is a function of a first distance by which the at least one activation element when activated is activated from the first degree of activation, and wherein the air, at least upon reaching a maximum pressure within the material valve activation device, flows from the material valve activation device to the at least one air nozzle.

15. The spray gun of claim 1, wherein the spray gun is designed such that the position in which the at least one material valve is held is adjustable in steps via the position in which the at least one activation element is held.

16. The spray gun of claim 1, wherein the spray gun is designed such that the position in which the at least one material valve is held changes in individual steps as a function of the variation of the position of the at least one activation element.

17. The spray gun of claim 1, wherein the spray gun is designed such that the at least one material valve is opened pneumatically by air from the at least one first valve outlet region, and is closed mechanically by a spring force.

18. A spray gun comprising:

a first air valve activatable by an activation element and including a first valve inlet region and a first valve outlet region;

a second air valve disposed upstream of the first air valve, the second air valve including a second valve outlet region that is disposed between the first air valve and the second air valve; and a material valve for material to be sprayed, the material valve being designed such that the material valve is able to be pneumatically activated by air from the first valve outlet region, wherein the spray gun is designed such that the material valve can assume a first terminal position in which the material valve is closed, a second terminal position in which the material valve is completely opened, and an intermediate position in which the material valve is partially opened, wherein the spray gun is designed such that the activation element can assume a first terminal position in which the activation element is non-activated, a second terminal position in which the activation element is completely activated, and an intermediate position in which the activation element is partially activated, wherein the position of the activation element determines the position of the material valve, wherein the spray gun further comprises a material valve activation device that includes an air inlet, an air outlet, and an intervening air chamber that on at least one side is delimited by a material valve activation element for activating the material valve, wherein the first air valve is formed by at least part of the main body of the spray gun and by a valve piston that is disposed between the activation element and a closure part of the second air valve, wherein the second valve outlet region opens into an air outlet opening of the spray gun, and wherein the valve piston includes a clearance that is enlarged in the direction of the activation element of the spray gun such that, when the activation element is held in the intermediate position in which the activation element is partially activated, the clearance connects the first valve outlet region and the second valve outlet region, which allows the material valve to remain in the intermediate position in which the material valve is partially opened.

19. A spray gun comprising:

at least one first air valve activatable by at least one activation element and including at least one first valve inlet region and at least one first valve outlet region; and at least one material valve for material to be sprayed, the at least one material valve being designed such that the at least one material valve is able to be pneumatically activated by air from the at least one first valve outlet region, wherein the spray gun is designed such that the at least one material valve can assume at least one first terminal position in which the at least one material valve is closed, one second terminal position in which the at least one material valve is completely opened, and at least one intermediate position in which the at least one material valve is partially opened, wherein the spray gun is designed such that the at least one activation element can assume at least one first terminal position in which the at least one activation element is non-activated, one second terminal position in which the at least one activation element is completely activated, and at least one intermediate position in which the at least one activation element is partially activated, wherein the position of the at least one activation element determines the position of the at least one material valve, wherein the spray gun further comprises a material valve activation device that includes an air chamber, wherein the air chamber on at least one side is delimited by at least one material valve activation element for activating the at least one material valve, the at least one material valve activation element comprising a piston, wherein the air chamber includes an air inlet and an air outlet that are disposed in front of the piston, wherein an air outlet valve is arranged in the air outlet and comprises a throttle valve and/or a pressure relief valve, wherein the spray gun is designed such that the pressure in front of the piston is determined by a combination of the quantity of air supplied via the air inlet to the air chamber and the quantity of air flowing out of the air outlet valve, and wherein the spray gun is designed such that, when the at least one activation element is held in the at least one intermediate position in which the at least one activation element is partially activated, the pressure in front of the piston holds the piston in an intermediate position, which holds the at least one material valve in the at least one intermediate position in which the at least one material valve is partially opened.

20. The spray gun of claim 19, wherein no air inlet and no air outlet are disposed behind the piston.

* * * * *